US011272073B2

(12) United States Patent
Sakata

(10) Patent No.: US 11,272,073 B2
(45) Date of Patent: Mar. 8, 2022

(54) IMAGE PROCESSING APPARATUS, CONTROL METHOD, AND STORAGE MEDIUM FOR STORING IMAGE DATA TO A FOLDER

(71) Applicant: CANON KABUSHIKI KAISHA, Tokyo (JP)

(72) Inventor: Munetaka Sakata, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/784,152

(22) Filed: Feb. 6, 2020

(65) Prior Publication Data

US 2020/0280649 A1 Sep. 3, 2020

(30) Foreign Application Priority Data

Feb. 28, 2019 (JP) .............................. JP2019-036851

(51) Int. Cl.
*G06K 9/00* (2006.01)
*H04N 1/21* (2006.01)
*H04N 1/00* (2006.01)

(52) U.S. Cl.
CPC ....... *H04N 1/2187* (2013.01); *G06K 9/00456* (2013.01); *G06K 9/00469* (2013.01); *H04N 1/00129* (2013.01); *H04N 1/00244* (2013.01); *H04N 1/00437* (2013.01)

(58) Field of Classification Search
CPC ........... G06K 9/00456; G06K 9/00463; G06K 9/00469
USPC ................................................. 358/1.15, 403
See application file for complete search history.

(56) References Cited

U.S. PATENT DOCUMENTS

| 2004/0148453 | A1* | 7/2004 | Watanabe | H04N 1/32112 711/1 |
| 2005/0010593 | A1* | 1/2005 | Fellenstein | G06F 16/10 |
| 2009/0240749 | A1* | 9/2009 | Ito | G06F 16/93 |
| 2012/0311001 | A1* | 12/2012 | Meng | G06F 16/1847 707/824 |
| 2014/0122479 | A1* | 5/2014 | Panferov | G06F 3/0643 707/736 |
| 2014/0169675 | A1* | 6/2014 | King | G06K 9/18 382/182 |

FOREIGN PATENT DOCUMENTS

JP 2010-141636 A 6/2010

* cited by examiner

*Primary Examiner* — Jamares Q Washington
(74) *Attorney, Agent, or Firm* — Canon U.S.A., Inc. IP Division

(57) ABSTRACT

An image processing apparatus recognizes a character string included in image data generated by a reading unit, displays the recognized character string, receives a selection, performed by a user, of the displayed character string. The image processing apparatus thereafter determines, as a storage destination for the image data, a folder named with the character string that is based on the received selection and thereby stores the image data in the determined storage destination. Additionally, the image processing apparatus, in response to a reading instruction being issued once, reads images of a plurality of documents to generate image data, receives a plurality of times selection, performed by the user, of the displayed character string, and determines, as storage destinations, a plurality of folders named with the respective character strings that are based on the selection received a plurality of times.

14 Claims, 27 Drawing Sheets

FIG.6

TO PORTAL  LOGOUT

APPLICATION LIBRARY

APPLICATION MANAGEMENT | ONE-TOUCH TRANSMISSION SCAN > DETAILED INFORMATION ABOUT BUTTON > EDITING OF BUTTON

DISPLAY SETTING OF BUTTON IN HOME SCREEN

EDITING OF BUTTON ~600

613~ [OK] [CANCEL] ~614

DETAILED INFORMATION ABOUT BUTTON

BASIC SETTING
BUTTON NAME: [MEDICAL QUESTIONNAIRE] ~601
☐ DISPLAY CONFIRMATION SCREEN BEFORE EXECUTION

ICONS  602

DIVISIONAL TRANSMISSION  ☑ DO  [1] DOCUMENTS ~603

KEYWORD  [KEYWORD CHARACTER STRING SETTING] ~604

ALLOCATION  [PERFORM ALLOCATION BY FOLDER ▼] ~605
[DO NOT PERFORM ALLOCATION BY FOLDER]

TRANSMISSION TYPE  [FILE ▼]  [SWITCHING] ~607
606  [USB MEMORY]

608~ TRANSMISSION SETTING (FILE)

TRANSMISSION DESTINATION: [¥¥file_server¥medical_questionnaire] [SELECTION FROM ADDRESS BOOK...]
READING SIZE: [A4 ▼]  609  610
COLOR MODE: [COLOR ▼]
FILE FORMAT: [PDF ▼] ~611
ENCRYPTED PDF: [Acrobat 10.0 or Equivalent/256-bit AES ▼]
☐ SET/CHANGE PASSWORD
PASSWORD: [           ]
CONFIRMATORY ENTRY: [           ]
ELECTRONIC SIGNATURE: [NONE ▼]
☐ DIVIDE FOR EVERY PAGE
DENSITY: [0 ▼]
ORIENTATION OF DOCUMENT: [PORTRAIT DOCUMENT ▼]
TYPE OF DOCUMENT: [TEXT/PHOTO ▼]
TWO-SIDED DOCUMENT: [DO NOT ▼] ~612
SHARPNESS: [0 ▼]
DATA SIZE: [LARGE: IMAGE QUALITY PRIORITY ▼]

SETTING MENU SWITCHING FOR EVERY TRANSMISSION TYPE

FIG.7A

APPLICATION LIBRARY

APPLICATION MANAGEMENT | ONE-TOUCH TRANSMISSION SCAN > DETAILED INFORMATION ABOUT BUTTON > EDITING OF BUTTON > KEYWORD CHARACTER STRING SETTING

KEYWORD CHARACTER STRING SETTING ~700

TO PORTAL    LOGOUT

[OK] 707   [CANCEL] 708

| KEYWORD CHARACTER STRING | |
|---|---|
| TYPE OF CHARACTER | ONLY NUMERALS ▼ / ALPHANUMERIC ~701 |
| NUMBER OF CHARACTERS (UP TO 16 CHARACTERS) | 7 ~702 |
| DISPLAY ON ENTRY (UP TO 64 CHARACTERS) | Please enter the patient number. ~703 |
| CHARACTER RECOGNITION | DO ▼ / DO NOT ~704 |
| CHARACTER RECOGNITION REGION | DO NOT DESIGNATE ▼ / DESIGNATE ~705   [REGION DESIGNATION] ~706 |

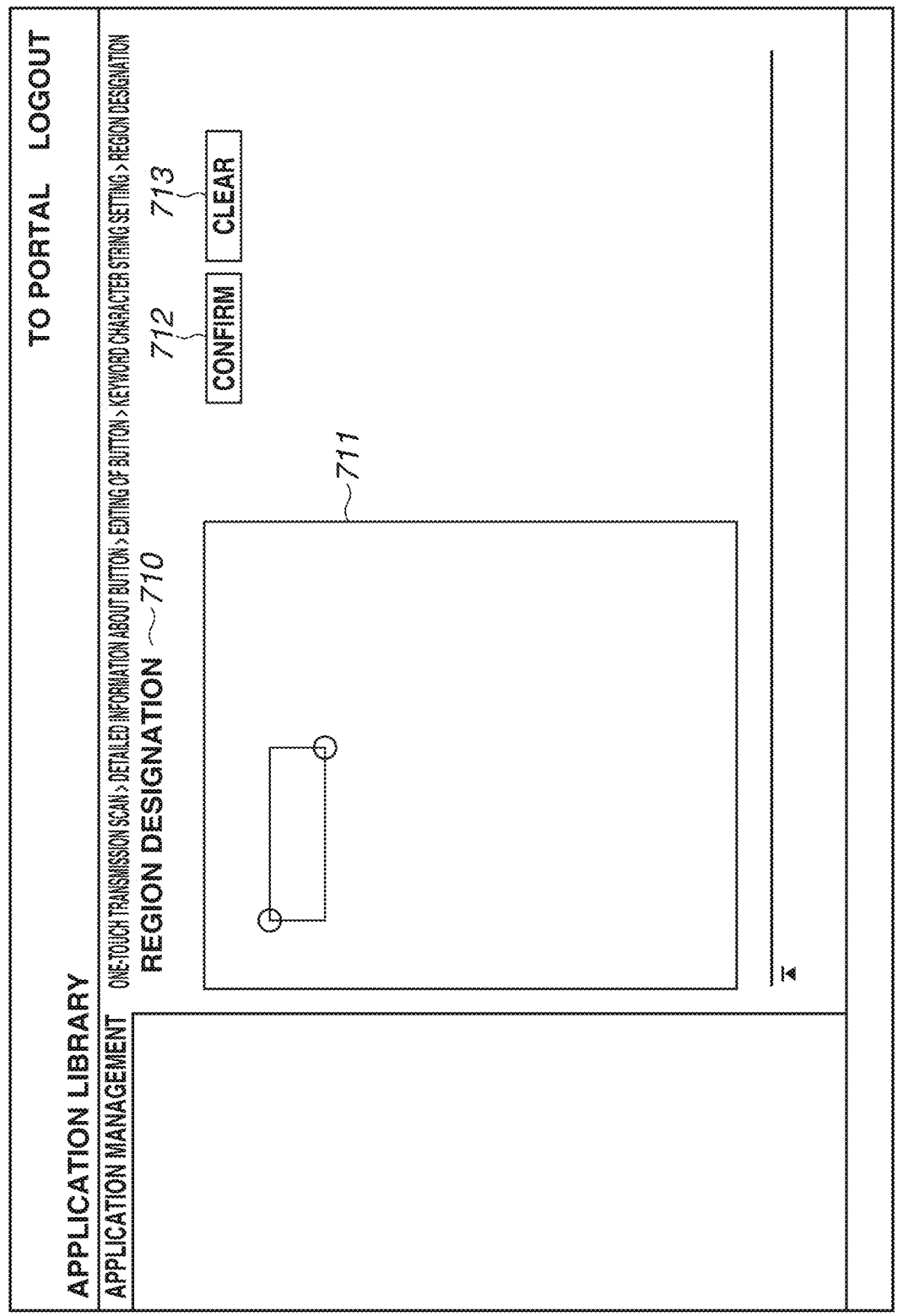

FIG.8A

APPLICATION LIBRARY

APPLICATION MANAGEMENT | ONE-TOUCH TRANSMISSION SCAN > DETAILED INFORMATION ABOUT BUTTON > EDITING OF BUTTON > SELECTION FROM ADDRESS BOOK

TO PORTAL   LOGOUT

SELECTION FROM ADDRESS BOOK ~800

Please select a destination from the address book, and click on "OK".

802~ [ OK ]   803~ [ CANCEL ]

ADDRESS LIST ~801

| SELECTION | NUMBER | TYPE | NAME | DESTINATION |
|---|---|---|---|---|
| ⦿ | 01 | 📄 | MEDICAL QUESTIONNAIRE | ¥¥file_server¥medical_questionnaire |
| ○ | 02 | 📄 | MEDICAL QUESTIONNAIRE (EXTERNAL) | http://www.example.com/WebDAV/medical_record |
| ○ | 03 | 📄 | REFERRAL FORM | ¥¥file_server¥unknown_medical_questionnaire |

FIG.8B

ADDRESS BOOK: ADDRESS REGISTRATION AND EDITING: FILE     TO PORTAL   LOGOUT

ADDRESS BOOK

810

FILE

NUMBER  01 ~811
NAME  MEDICAL QUESTIONNAIRE ~812
PROTOCOL  SMB ▼ ~813
  FTP
  WebDAV
HOST NAME  FILE SERVER ~814
PATH TO FOLDER  MEDICAL QUESTIONNAIRE ~815
USER NAME  iryou01 ~816
817~ ☑ Set a password.
PASSWORD  iryou01 ~818

819~ OK    820~ CANCEL

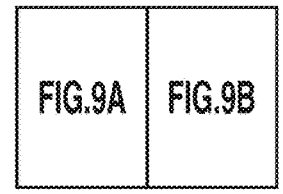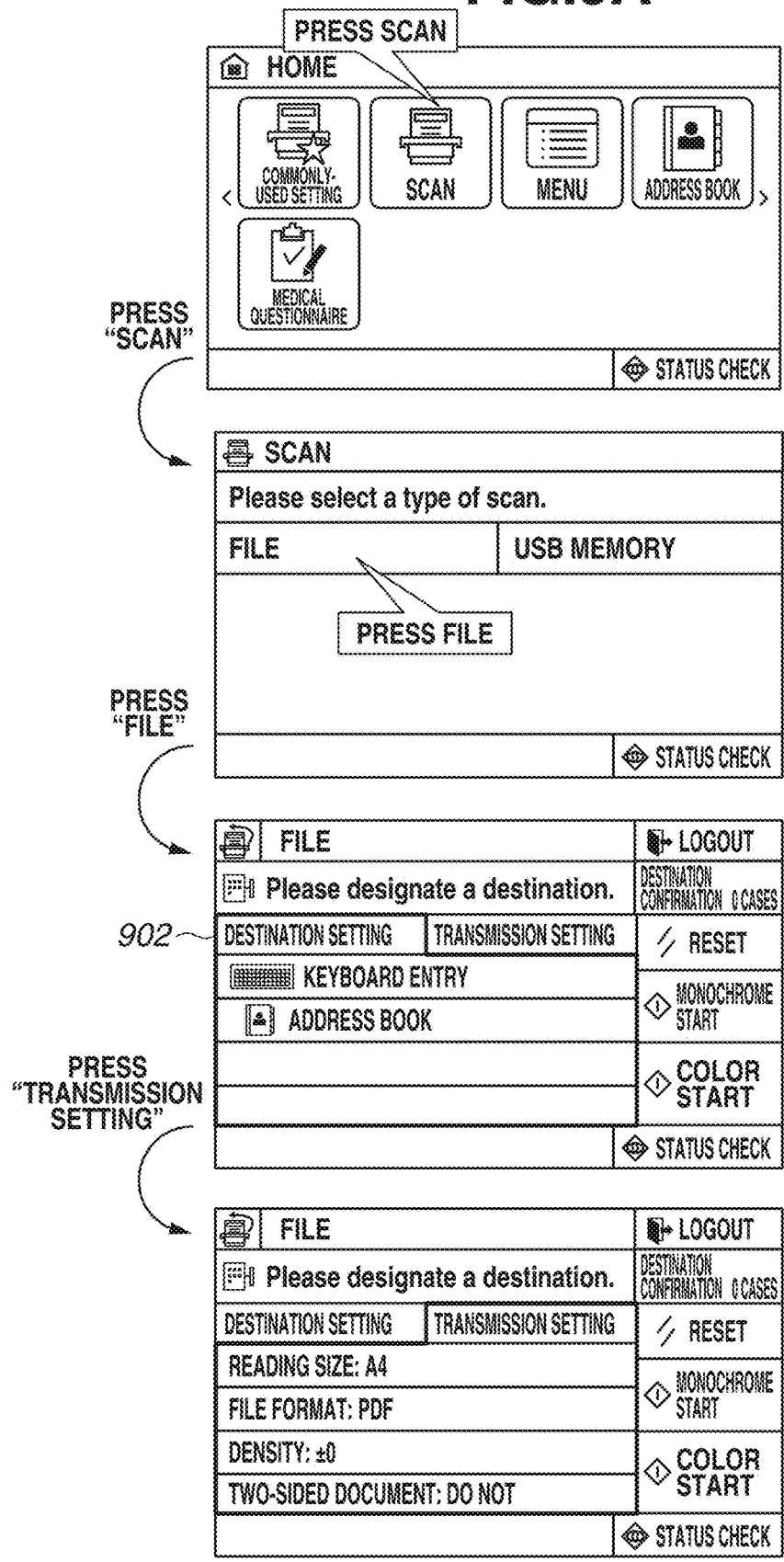

FIG.9B

SELECT "KEYBOARD ENTRY" →

| ⤺ HOST NAME |
| ¥¥aaa.net  ⌫  <  > |
| 903 — q w e r t y u i o p - |
| a s d f g h j k l |
| @ z x c v b n m , . / |
| ⇧ 1/# space |
| CONFIRM |

SELECT "CONFIRM"

SELECT "ADDRESS BOOK" →

| ⤺ ADDRESS BOOK |
| ✓ MEDICAL QUESTIONNAIRE |
| ✓ MEDICAL QUESTIONNAIRE (EXTERNAL) |
| ✓ UNKNOWN MEDICAL QUESTIONNAIRE |
| < ★ 🗐 ✉ 🗂 📰 >  CONFIRM |

SELECT "CONFIRM"

MEDICAL QUESTIONNAIRE

1601

Please enter the patient number.

1602

| 1603 | 1604 | 1605 |
|---|---|---|
| TRANSMIT | SKIP | END |

Please enter the patient number.

1611

7-DIGIT NUMERALS

1612

0123456

| 1614 | 1613 |
|---|---|
| CANCEL | CONFIRM |

FIG.20

MEDICAL QUESTIONNAIRE — 1901

Please enter the patient number.

| ! | I234567 |

1903  1905  1906  1904  1902

MEDICAL QUESTIONNAIRE

PATIENT ID    1234567

EXAMINATION ID    KE00001

DOCTOR ID    DR99999

~~~~ ~~~ ~~ ~~ ~
~~~~ ~~~ ~~ ~~ ~
~~~~ ~~~ ~~ ~~ ~
~~~~ ~~~ ~~ ~~ ~
~~~~ ~~~ ~~ ~~ ~

MEDICAL QUESTIONNAIRE

PATIENT ID

I234567

EXAMINATION ID

KE00001

DOCTOR ID

DR99999

1909 — TRANSMIT    1908 — SKIP    1907 — END

1900

IMAGE PROCESSING APPARATUS, CONTROL METHOD, AND STORAGE MEDIUM FOR STORING IMAGE DATA TO A FOLDER

BACKGROUND

Field

The present disclosure generally relate to an image processing apparatus, a control method therefor and a storage medium therefor.

Description of the Related Art

Japanese Patent Application Laid-Open No. 2010-141636 discusses, among image processing apparatuses each of which reads images of a plurality of documents to generate electronic data, an image processing apparatus which divides the generated electronic data corresponding to a plurality of documents into a plurality of pieces of electronic data and then transmits the plurality of pieces of electronic data obtained by division to a plurality of previously registered destinations. The image processing apparatus discussed in Japanese Patent Application Laid-Open No. 2010-141636 transmits, depending on the type of a document, electronic data to a destination corresponding to the document (for example, in the case of a document A, to a destination 1, and, in the case of a document B, to a destination 2).

Moreover, the image processing apparatus discussed in Japanese Patent Application Laid-Open No. 2010-141636 necessitates that, to register destinations to which to transmit electronic data, the user previously select each destination from an address book registered in the image processing apparatus and associate the selected destination with every corresponding type of a document.

In the case of an apparatus which, after reading of a document, requires the user to select a character string used for storing image data in a plurality of folders as storage destinations, it is desired that the user only needs to issue a reading instruction once to cause reading of a document to be started.

While the image processing apparatus discussed in Japanese Patent Application Laid-Open No. 2010-141636 is able to store image data in a plurality of folders in response to a reading instruction being issued once, this is not an operation which the user is allowed to select after reading of a document, but is an operation which requires the user to perform pre-registration.

Therefore, for example, in some cases, the types of documents intended to be read by the image processing apparatus may be unfixed and a new type of document may be intended to be read. Since the image processing apparatus discussed in Japanese Patent Application Laid-Open No. 2010-141636 requires the user to perform pre-registration, if the user forgets to perform pre-registration before causing the image processing apparatus to read the new type of document, it becomes impossible to store image data in a correct storage destination.

SUMMARY

Aspects of the present disclosure are generally directed to, in the case of an apparatus which, after reading of a document, requires a user to select a character string used for storing image data in a plurality of folders as storage destinations, allowing the user to do without having to issue a reading instruction a plurality of times to cause reading of a document to be started.

According to an aspect of the present disclosure, an image processing apparatus includes a reading unit configured to read an image of a document to generate image data, a character recognition unit configured to recognize a character string included in the image data generated by the reading unit, a display unit configured to display the character string recognized by the character recognition unit, a reception unit configured to receive selection, performed by a user, of the character string displayed by the display unit, a determination unit configured to determine, as a storage destination for the image data, a folder named with the character string that is based on the selection received by the reception unit, and a storing unit configured to store the image data in the storage destination determined by the determination unit, wherein, in response to a reading instruction being issued once, the reading unit reads images of a plurality of documents to generate image data, the reception unit receives a plurality of times selection, performed by the user, of the character string displayed by the display unit, and the determination unit determines, as storage destinations, a plurality of folders named with the respective character strings that are based on the selection received a plurality of times by the reception unit.

Further features of the present disclosure will become apparent from the following description of exemplary embodiments with reference to the attached drawings.

BRIEF DESCRIPTION OF THE DRAWINGS

FIG. 6 is a diagram illustrating an example of a setting edit screen for a button used to perform one-touch transmission scan.

FIGS. 7A and 7B are diagrams illustrating examples of screens each of which is displayed on the operation unit.

FIGS. 8A and 8B are diagrams illustrating examples of screens each of which is used to perform settings regarding an address book stored in the MFP.

FIG. 9, which is composed of FIGS. 9A and 9B, illustrating an example of a flow of screens in the case of reading an image of a document by a scanner to generate image data and transmitting the generated image data.

FIGS. 16A and 16B are diagrams illustrating examples of normal transmission screens.

FIG. 20 is a diagram illustrating an example in which "! (exclamation mark)" is displayed in an icon display region.

DESCRIPTION OF THE EMBODIMENTS

Various exemplary embodiments, features, and aspects of the disclosure will be described in detail below with reference to the drawings. Furthermore, configurations described in the following exemplary embodiments are merely examples, and the disclosure is not limited to the illustrated configurations.

Figure 1:
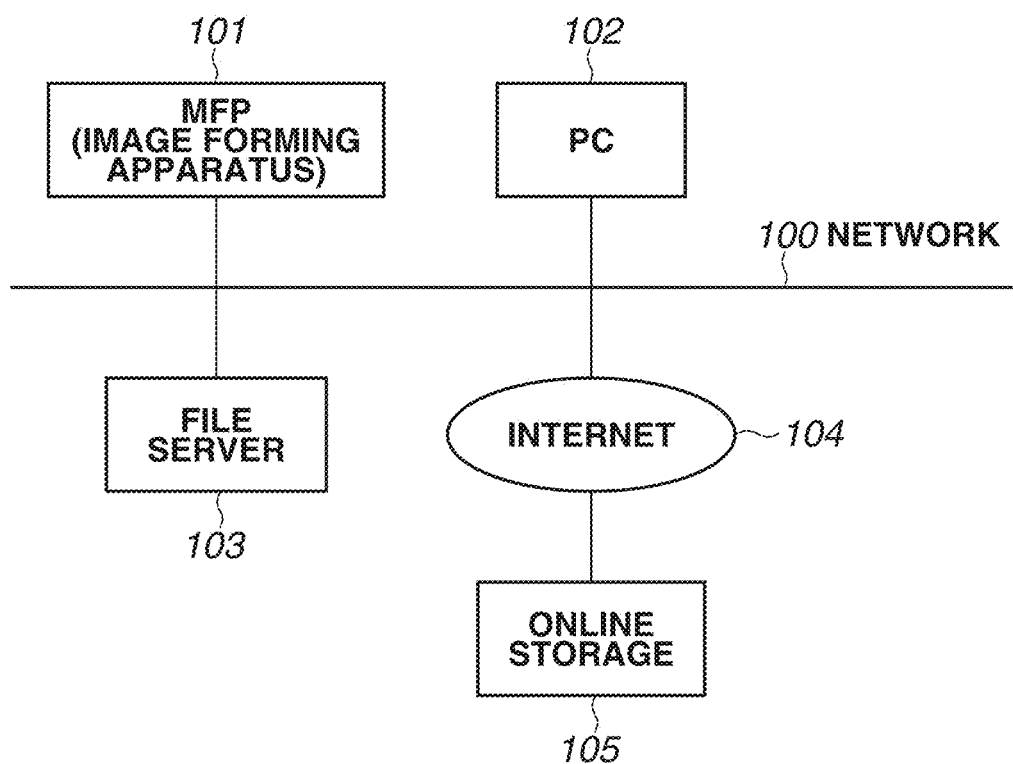
FIG. 1 is a diagram illustrating an example of a configuration of a reading system.

FIG. 1 is a diagram illustrating an example of a configuration of a reading system according to a first exemplary embodiment. The reading system according to the first exemplary embodiment includes a multifunction peripheral (MFP) 101, which is an example of an image processing apparatus, a personal computer (PC) 102, which is an example of an information processing apparatus, a file server 103, and an online storage 105. Each of the MFP 101, the PC 102, and the file server 103 are connected to a local area network (LAN) 100. Moreover, the MFP 101 and the online storage 105 are able to communicate with each other via the LAN 100 and the Internet 104.

The MFP 101 reads an image of a document to generate image data and then transmits the generated image data to the PC 102, the file server 103, and the online storage 105. Furthermore, image data in the present exemplary embodiment is not limited to an electronic file obtained by converting an image into raw data but can be an electronic file conforming to an image format, such as Tag Image File Format (TIFF) or Joint Photographic Experts Group (JPEG), or an electronic file such as a Portable Document Format (PDF) file. The file server 103 is a file server compliant with the File Transfer Protocol (FTP) and Server Message Block (SMB). The online storage 105 is an online storage compliant with Web Distributed Authoring and Versioning (WebDAV), which is a file-sharing protocol using the Hypertext Transfer Protocol (HTTP). The PC 102 is able to access a web server included in the MFP 101 with use of the HTTP to refer to or update setting values in the MFP 101. The LAN 100 can be configured with a wired LAN using the Ethernet or can be configured with a wireless LAN.

Figure 2:
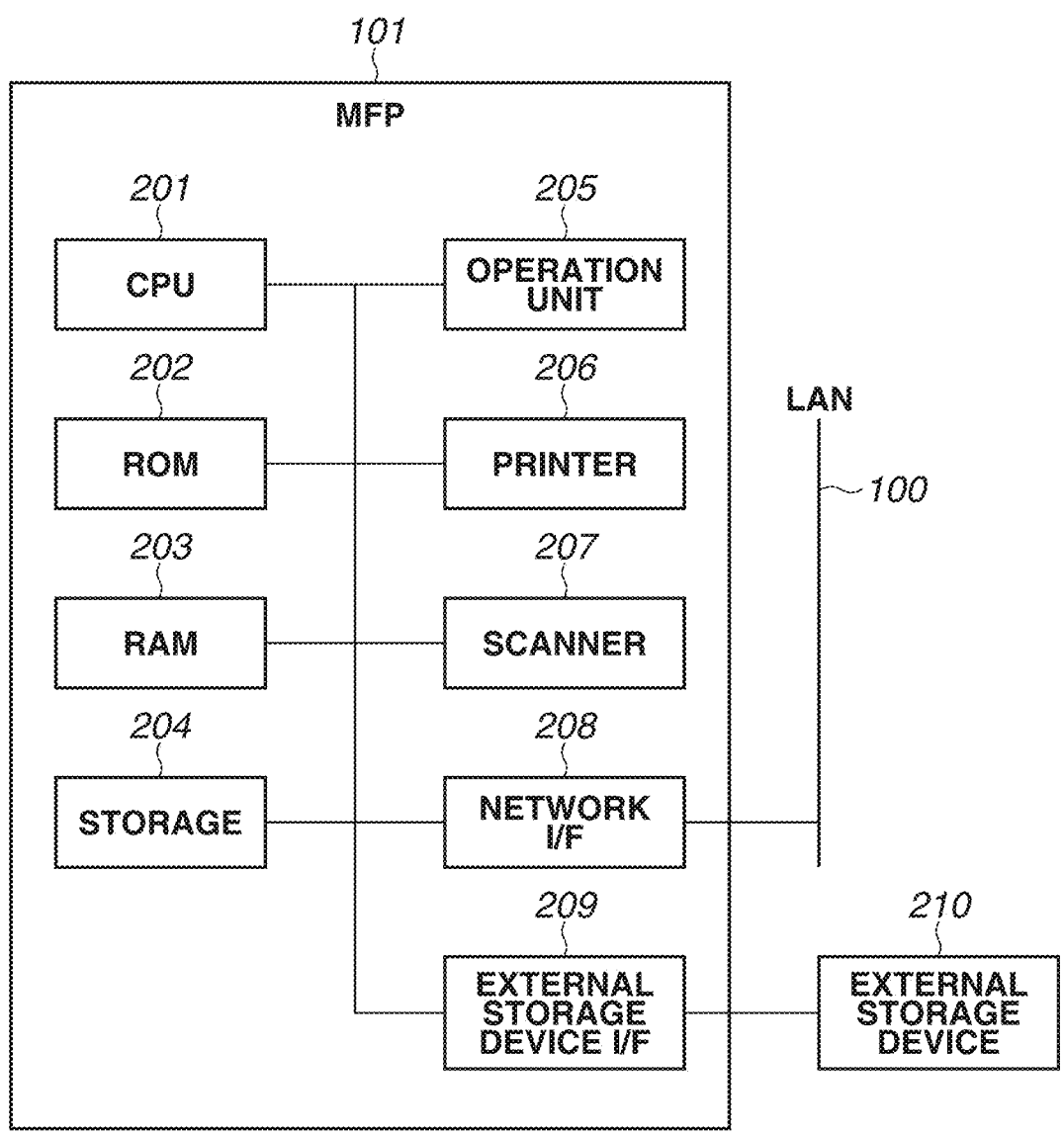
FIG. 2 is a diagram illustrating an example of a hardware configuration of a multifunction peripheral (MFP).

FIG. 2 is a diagram illustrating an example of a hardware configuration of the MFP 101. The MFP 101 includes a central processing unit (CPU) 201, a read-only memory (ROM) 202, a random access memory (RAM) 203, a storage 204, an operation unit 205, a printer 206, a scanner 207, a network interface (I/F) 208, and an external storage device I/F 209.

The CPU 201 implements various functions included in the MFP 101 by performing control of various pieces of hardware 202 to 208 constituting the MFP 101. Furthermore, the CPU 201 implements transmitting signals to various pieces of hardware via bus lines and mutually performing data communication with various pieces of hardware.

Moreover, the CPU 201 of the MFP 101 controls operations of the MFP 101 according to a control program stored in the ROM 202. More specifically, the CPU 201 implements an operating system (OS) for controlling the MFP 101 and a driver program for controlling hardware. Then, for example, application programs installed on the OS mutually operate to perform functional operations and control operations requested by the user. The OS and various programs are stored in the ROM 202 and are loaded onto the RAM 203 to be executed.

The ROM 202 is a memory in which to store programs and various pieces of data which the CPU 201 uses. The RAM 203 is a work memory for temporarily storing data which the CPU 201 uses for calculation. The storage 204 is a storage device which stores, for example, various pieces of data and various programs.

Furthermore, while, in the first exemplary embodiment, the storage 204 is assumed to be a flash memory, instead, an auxiliary storage device such as a solid state drive (SSD), a hard disk drive (HDD), or an embedded MultiMediaCard (eMMC) can be used. Furthermore, while, in the MFP 101, a single CPU 201 uses a single memory (RAM 203) to perform respective processing operations illustrated in the flowcharts described below, a different configuration can also be employed. For example, a plurality of CPUs, a plurality of RAMs, a plurality of ROMs, and a plurality of storages can be configured to cooperate with each other to perform respective processing operations illustrated in the flowcharts described below. Moreover, a configuration in which a hardware circuit, such as an application specific integrated circuit (ASIC) or a field-programmable gate array (FPGA), is used to perform a part of the processing operations can also be employed.

The operation unit 205 is a user interface via which the user operates the MFP 101, such as a touch panel, and is configured to receive an operation or input performed by the user. Moreover, the operation unit 205 is also able to be used as a display unit which displays, for example, a screen used to operate the MFP 101.

The printer 206 is a unit which implements a printing function, and is configured to execute a print job received from the PC 102 under the control of the CPU 201, thus forming an image on a sheet of paper. Here, the print job is data including, for example, instructions for causing the MFP 101 to perform print processing, image data, and print setting information.

The scanner 207 is a unit which implements a scanning function, and is configured to optically read an image of a document under the control of the CPU 201, thus generating image data.

The network I/F 208 is a network I/F used to perform, for example, wired LAN communication such as Ethernet. Furthermore, the network I/F 208 can be a network I/F used to perform wireless LAN communication or can be, for example, a USB-LAN I/F.

The external storage device I/F 209 is an I/F used for the MFP 101 to perform communication with an external storage device 210. The CPU 201 controls the external storage device I/F 209 to store image data in the external storage device 210. While, in the first exemplary embodiment, the external storage device I/F 209 is assumed to be a USB interface and the external storage device 210 is assumed to be a USB memory, the external storage device I/F 209 can be a Secure Digital (SD) card slot used to perform communication with an external storage device such as an SD card.

Figure 3:
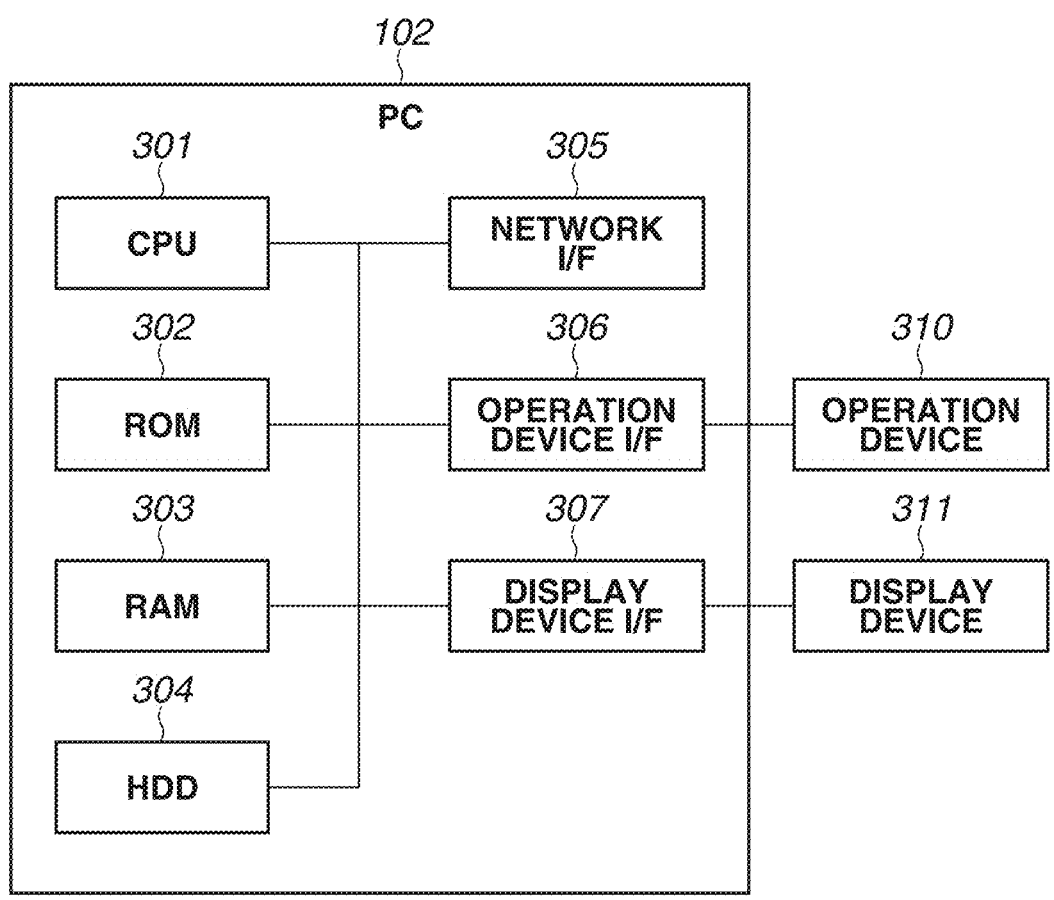
FIG. 3 is a diagram illustrating an example of a hardware configuration of a personal computer (PC).

FIG. 3 is a diagram illustrating an example of a hardware configuration of the PC 102. The PC 102 includes a CPU 301, a ROM 302, a RAM 303, an HDD 304, a network I/F 305, an operation device I/F 306, and a display device I/F 307.

The CPU 301 implements various functions included in the PC 102 by controlling the respective pieces of hardware 302 to 307 constituting the PC 102. Furthermore, the CPU 301 transmits signals to the respective pieces of hardware via bus lines, thus implementing mutually performing data communication with the other pieces of hardware.

Moreover, the CPU 301 of the PC 102 controls an operation of the PC 102 according to a control program stored in the ROM 302. More specifically, the CPU 301 executes, for example, an OS which controls the PC 102. Then, for example, application programs installed on the OS mutually operate, so that action and control operations of a function requested by the user are performed. Such an OS and control programs are stored in the ROM 302 and are read out onto the RAM 303 to be executed.

The ROM 302 is a memory for storing programs and various pieces of data which the CPU 301 uses. The RAM 303 is a memory for temporarily storing programs and data which the CPU 301 uses for calculation. The HDD 304 is a storage device which stores, for example, various pieces of data and various programs.

The network I/F 305 is a network I/F for performing wired LAN communication, such as Ethernet. Furthermore, the network I/F 305 can be a network I/F for performing wireless LAN communication or can be, for example, a USB-LAN I/F.

The operation device I/F 306 is an I/F used to interconnect an operation device 310, such as a keyboard and a mouse, and the PC 102.

The display device I/F 307 is an I/F used to interconnect a display device 311, such as a liquid crystal monitor, and the PC 102.

Furthermore, while the PC 102 in the first exemplary embodiment is connected to an external operation device and an external display device, for example, an operation unit and a display unit can be incorporated in the PC 102.

Figure 4:
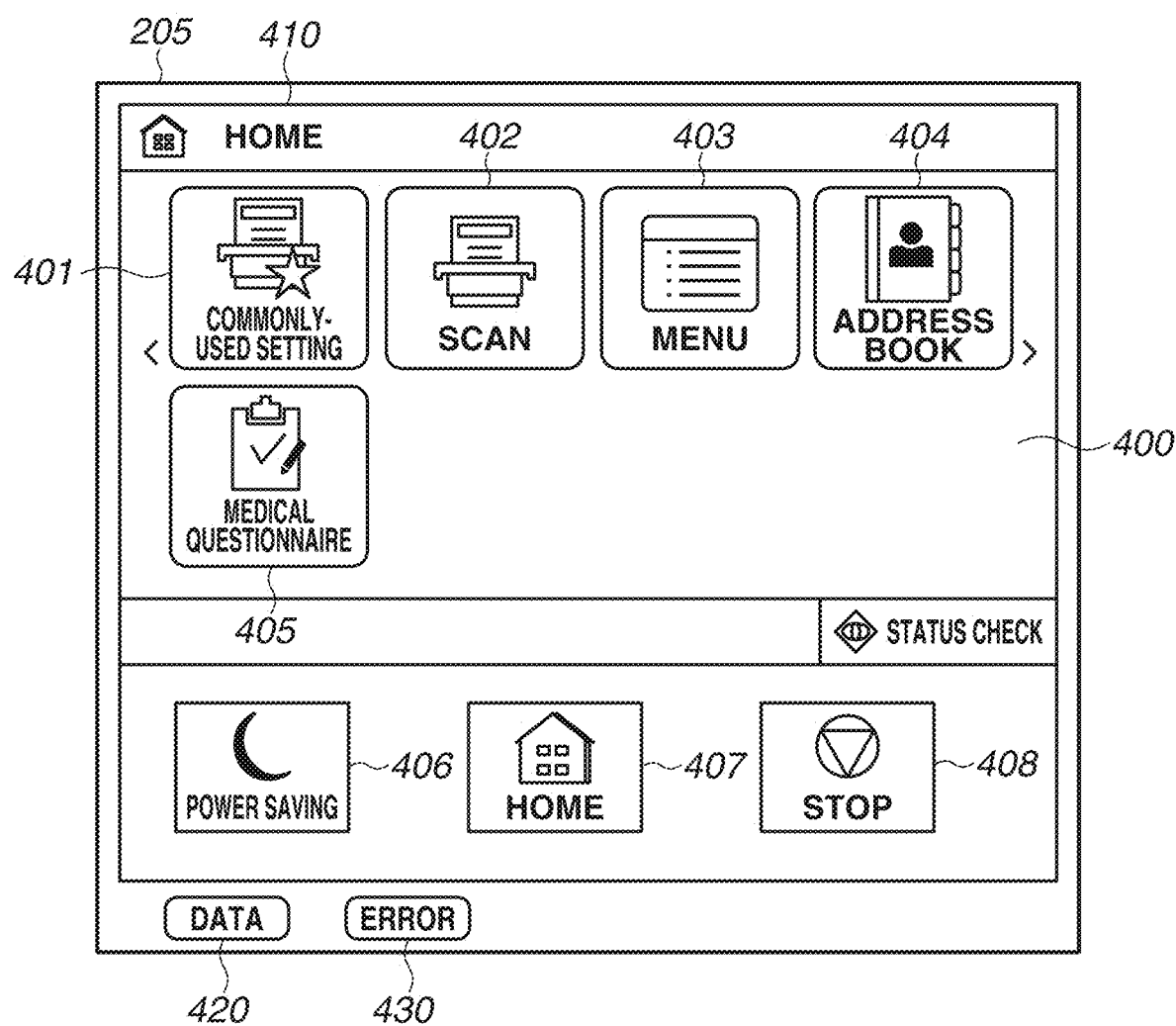
FIG. 4 is a diagram illustrating an example of a screen which is displayed on an operation unit.

FIG. 4 is a diagram illustrating an example of a screen which is displayed on the operation unit 205. The operation unit 205 includes a touch panel 410, a data light-emitting diode (LED) 420, and an error LED 430. A home screen 400, which is displayed immediately after start-up of the MFP 101, is displayed on the touch panel 410. The home screen 400 is a screen used to issue an instruction to perform each function of the MFP 101. In the home screen 400, for example, a commonly used setting button 401, a scan button 402, a menu button 403, an address book button 404, and a medical questionnaire button 405 are displayed. Moreover, in the home screen 400, a power saving button 406, a home button 407, and a stop button 408 are constantly displayed. Furthermore, the power saving button 406, the home button 407, and the stop button 408 can be included as hardware keys in the operation unit 205.

The commonly used setting button 401 is a button which, when selected by the user, is used to display an execution screen for a specific screen in the state in which the settings set by the user are input.

The scan button 402 is a button which, when selected by the user, is used to display a screen for performing scan processing to generate image data and performing e-mail transmission or file transmission of the generated image data or storing the generated image data in the external storage device 210. Here, e-mail transmission refers to attaching image data generated by reading a document to an e-mail and transmitting the e-mail with the image data attached thereto. Moreover, file transmission refers to transmitting the image data to, for example, the file server 103 or the PC 102 using a communication protocol, such as SMB or FTP.

The menu button 403 is a button which, when selected by the user, is used to display a menu screen.

The address book button 404 is a button which, when selected by the user, is used to display a screen for displaying registered addresses (destination information). The screen for displaying registered addresses is used to display, for example, a transmission type, such as e-mail transmission, SMB transmission, FTP transmission, or WebDAV transmission, and destination information, such as an e-mail address, a host name, and server information.

The medical questionnaire button 405 is a one-touch transmission button. The one-touch transmission button is button which, when selected by the user, is used to display a screen for reading an image of a document with scan setting previously set by the user to generate image data and transmitting the generated image data with a transmission type previously set by the user.

The power saving button 406 is a button which, when selected by the user, is used to cause the MFP 101 to transition to a power saving state.

The home button 407 is a button which, when selected by the user, is used to display the home screen 400 on the operation unit 205.

The stop button 408 is a button which, when selected by the user, is used to stop execution of a job, such as a print job, which the MFP 101 is executing. Furthermore, the stop button 408 can be a button which, when selected by the user, is used to stop execution of a copy job or transmission job.

Each of the data LED 420 and the error LED 430 is used to notify the user of the status of the MFP 101. The data LED 420 is turned on during execution of e-mail transmission or file transmission, and the error LED 430 is turned on when an error occurs in the MFP 101.

Furthermore, the home screen 400 is a function selection screen used to select a function which the user uses from among a plurality of functions including, for example, a copy function which performs printing based on image data and a transmission function which reads a document to generate image data and transmits the generated image data to an external apparatus.

Figure 5:
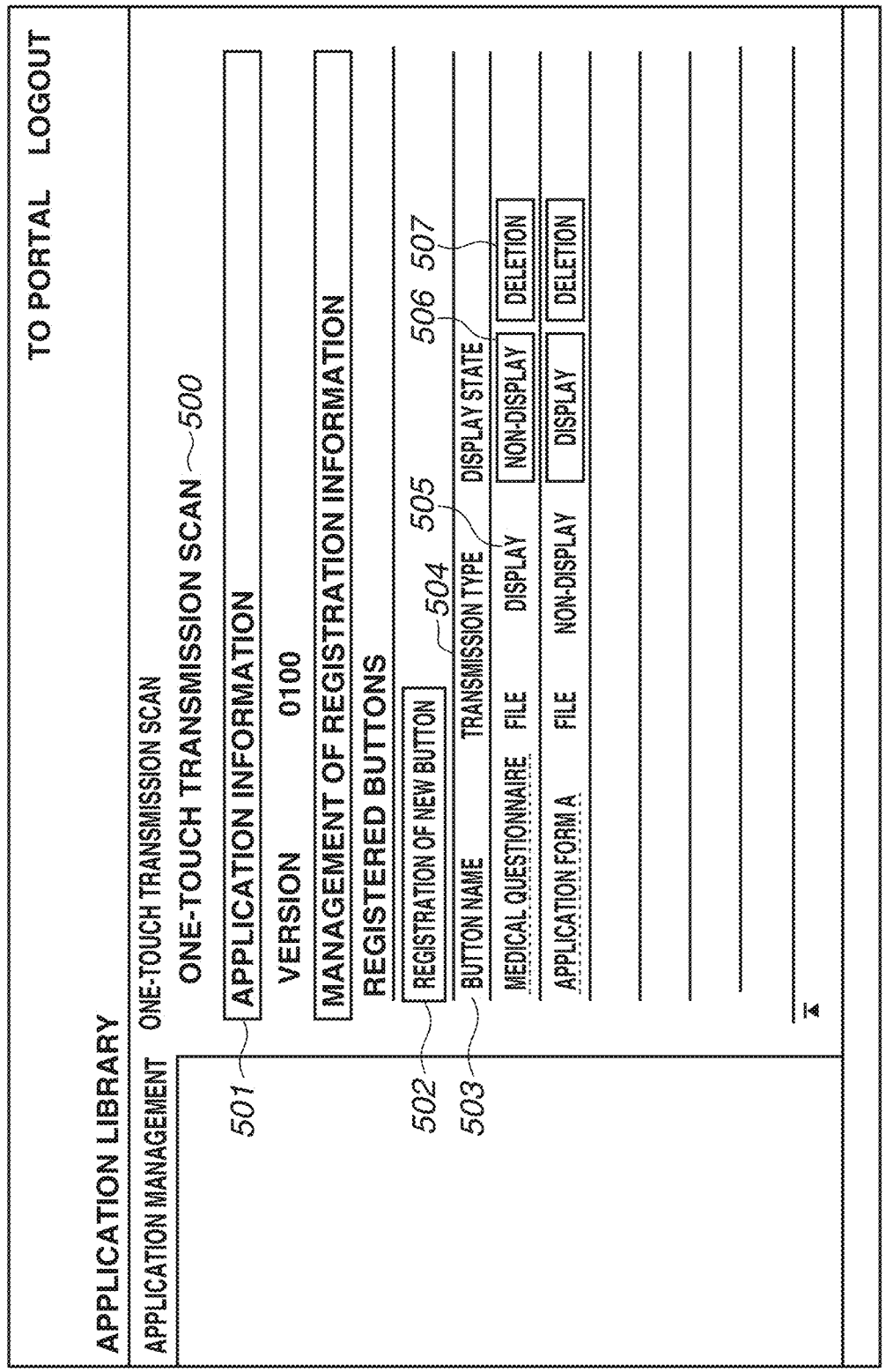
FIG. 5 is a diagram illustrating an example of a one-touch transmission scan setting screen.

FIG. 5 is a diagram illustrating an example of a one-touch transmission scan setting screen. The one-touch transmission scan setting screen 500 illustrated in FIG. 5 is displayed on, for example, the display device 311, which is connected to the PC 102 accessing a web server of the MFP 101 via HTTP communication.

In the one-touch transmission scan setting screen 500, application information 501, a new button registration button 502, items 503 to 505, a display or non-display button 506, and a deletion button 507 are displayed.

The application information 501 is a region used to display the version of an application, in which, in FIG. 5, a version number "0100" is displayed.

The new button registration button 502 is a button which, when selected by the user, is used to register a new button which is displayed in a screen displayed on the operation unit 205 and is used to perform one-touch transmission scan. When the new button registration button 502 is selected, a setting editing screen 600 illustrated in FIG. 6 is displayed on the display device 311. Details of the setting editing screen 600 illustrated in FIG. 6 are described below.

The item 503 represents the name of a button used to perform one-touch transmission scan registered in the MFP 101.

The item 504 represents a transmission type set for the button used to perform one-touch transmission scan registered in the MFP 101.

The item 505 represents a display state of the button used to perform one-touch transmission scan registered in the MFP 101. Moreover, a display/non-display switching button 506, which is used to change the display state, and a deletion button 507 are also displayed. For example, in a case where the display state of the "medical questionnaire" button is set to "display", a corresponding button such as the medical questionnaire 405 illustrated in FIG. 4 is displayed in the home screen 400 on the touch panel 410. The display/non-display switching button 506 is a button which is togglable between "display" and "non-display" of the corresponding button.

When selected by the user, the deletion button 507 is used to delete information about the button registered in the MFP 101.

With regard to an example of the button used to perform one-touch transmission scan registered in the MFP 101, the transmission type of a button named "application form A" is "file" (for example, SMB or FTP), and the display state thereof is set to "non-display". Moreover, not only in a case where the new button registration button 502 has been selected but also in a case where the name of the button "medical questionnaire" or "application form A" has been selected, the setting editing screen 600 illustrated in FIG. 6 is displayed on the display device 311.

In FIG. 5, two buttons "medical questionnaire" and "application form A" are registered. With regard to the button "medical questionnaire", since the display state thereof is "display", a corresponding button is displayed in the home screen 400. However, with regard to the button "application form A", since the display state thereof is "non-display", a corresponding button is not displayed in the home screen 400.

FIG. 6 is a diagram illustrating an example of a setting editing screen for the button used to perform one-touch transmission scan. The button setting editing screen 600 illustrated in FIG. 6 is displayed on, for example, the display device 311, which is connected to the PC 102 accessing a web server of the MFP 101 via HTTP communication.

The button setting editing screen 600 is displayed in response to the new button registration button 502 or the name of the button illustrated in FIG. 5 being selected by the user. In a case where the button setting editing screen 600 is displayed in response to the name of the button being selected by the user, the respective items of the button setting editing screen 600 are displayed in the state in which the last set values are input therein. In a case where the button setting editing screen 600 is displayed in response to the new button registration button 502 being selected by the user, the respective items of the button setting editing screen 600 are displayed in the state in which no values are input therein. Furthermore, default values can be previously input in the respective items of the button setting editing screen 600.

An entry field 601 is an entry field used to set the name of a one-touch transmission button. A character string "medical questionnaire" is input in the entry field 601. Here, the one-touch transmission button is a button which, when selected by the user, is used to perform one-touch transmission scan.

A checkbox 602 and an entry field 603 are objects used to perform setting regarding divisional transmission. In response to the checkbox 602 being checked, divisional transmission is enabled. Here, divisional transmission is the function of transmitting image data generated by reading with scan performed one time to separate destinations. For example, in a case where "one document" is set in the entry field 603 illustrated in FIG. 6, image data generated for every one document is transmitted to separate destinations. The entry field 603 is an object used to set by what number of documents to divide image data during divisional transmission.

Furthermore, with regard to setting for divisional transmission, irregular numbers of documents, such as three documents, two documents, three documents, and one document, can be set for divisional transmission. In this case, a configuration in which the number of documents for divisional application is able to be set when a reading instruction is received can also be employed.

A keyword character string setting button 604 is a button which, when selected by the user, is used to display a keyword character string setting screen 700 illustrated in FIG. 7A.

A pull-down menu 605 is an object used to set how to allocate files to be transmitted or whether to allocate files to be transmitted. In the pull-down menu 605, one of settings "perform allocation by folder" and "do not perform allocation by folder" is selectable. In a case where the setting "perform allocation by folder" is selected, the MFP 101 transmits electronic data to a folder having a keyword character string set in the keyword character string setting screen. In a case where the setting "do not perform allocation by folder" is selected, the MFP 101 transmits electronic data to a fixed folder.

A pull-down menu 606 is an object used to select a transmission type with which to transmit image data generated by image reading. In the pull-down menu 606, one of "file" and "USB memory" is selectable. In a case where "file" is selected and a switching button 607 is selected, the MFP 101 transmits the image data to a folder included in the PC 102 or the file server 103 with use of a protocol such as SMB, FTP, WebDAV, or SFTP. In a case where "USB memory" is selected, the MFP 101 stores the image data in a USB memory, which is the external storage device 210 connected to the MFP 101.

The switching button 607 is a button used to switch setting of the transmission type to the transmission type displayed in the pull-down menu 606. Moreover, when the switching button 607 is selected while a transmission type has been selected in the pull-down menu 606, information corresponding to the selected transmission type is displayed in an item 608.

The item 608 includes items in which various settings, such as a reading setting employed to perform image reading by one-touch transmission scan and a transmission setting employed to perform transmission, are able to be input and other settings of, for example, a transmission destination, a reading size, a file format, and the orientation of a document.

A region 609 is a region for displaying a transmission destination to which to transmit image data generated by image reading. The destination set here is a folder path which is to be combined with a character string of a text object described below. Moreover, the region 609 is a text region in which neither inputting nor editing is possible, and is used to display an address selected in an address selection screen.

A "selection from address book" button 610 is a button which, when selected by the user, is used to display an address selection screen 800, in which an address is able to be selected from the address book stored in the MFP 101.

A pull-down menu 611 is a pull-down menu used to set a file format with which to convert image data generated by reading an image of a document into a file. A file is generated according to the file format selected here.

A pull-down menu 612 allows one of "do" and "do not" to be selected. In a case where "do" is selected, the MFP 101 performs two-sided reading of a document to generate an electronic file. In a case where "do not" is selected, the MFP 101 performs one-sided reading of a document to generate an electronic file.

An OK button 613 is a button used to store, in the storage 204, the setting of the one-touch transmission button as the contents set in the button setting editing screen 600. When the OK button 613 is selected, the setting is stored in the storage 204. A cancel button 614 is a button used to discard the setting. When the OK button 613 or the cancel button 614 is selected, the one-touch transmission scan setting screen 500 illustrated in FIG. 5 is displayed.

FIG. 7A is a diagram illustrating an example of a keyword character string setting screen. The keyword character string setting screen 700 is displayed in response to the keyword character string setting button 604 being selected in the button setting editing screen 600 illustrated in FIG. 6. Moreover, the keyword character string setting screen 700 illustrated in FIG. 7A is displayed on, for example, the display device 311 connected to the PC 102 accessing a web server of the MFP 101 via HTTP communication.

A pull-down menu 701 is an object used to select the type of a keyword character string. As the keyword character string, one of "only numerals" and "alphanumeric" is selectable.

An entry field 702 is an entry field used to set the number of characters of the keyword character string. In the first exemplary embodiment, the settable number of characters is up to 16 characters. Here, setting the number of characters of the keyword character string enables, in a case where a character string recognized in the set character recognition region differs from a character string which the user desires, preventing such a different character string from being displayed as a recognition result. Furthermore, this setting of the keyword character string is reflected in a case where a region designation button 706 is selected and a region is designated in a character recognition region setting screen 710 illustrated in FIG. 7B.

An entry field 703 is an entry field in which to enter a character string which is to be displayed at the time of inputting of a keyword character string. The settable number of characters is up to 64 characters.

A pull-down menu 704 is an object used to select whether to perform OCR processing, which is character recognition processing.

A region 705 is a region used to display information indicating whether a character recognition region is previously designated. The initial value of the region 705 is set as "no designation", and, when a region designation button 706 is selected and a rectangle region is designated in the character recognition region setting screen 710 illustrated in FIG. 7B, "designate" is displayed in the region 705. Moreover, when a clear button 713 is selected in the character recognition region setting screen 710 to delete a rectangle region and, then, a confirm button 712 is selected, "do not designate" is displayed in the region 705.

FIG. 7B is a diagram illustrating an example of the character recognition region setting screen 710. A region designation canvas 711 having an aspect ratio corresponding to paper of the reading size indicated in the item 608 is displayed in the character recognition region setting screen 710. The user can designate a starting point and an ending point of the rectangle region with a pointer, so that starting point coordinates and ending point coordinates of the designated points are converted into real-space distances, which are then temporarily stored. Specific setting values can be set as a starting point (X, Y)=(10, 10) and an ending point (X, Y)=(50, 20) in units of mm. When the clear button 713 is selected, the setting values of the character recognition region are returned to initial values thereof. When the confirm button 712 is selected, coordinate information about two points temporarily stored is set as a character recognition region, and the screen illustrated in FIG. 7A is resumed. Information regarding the set character recognition region is stored in the storage 204 in response to the OK button 707 being selected. Furthermore, setting of a character recognition region can also be performed by pressing the medical questionnaire button 405. The method of setting a character recognition region using the medical questionnaire button 405 is described below with reference to FIG. 12.

FIGS. 8A and 8B are diagrams illustrating examples of screens used to perform setting regarding the address book stored in the MFP 101. FIG. 8A is a diagram illustrating an example of an address selection screen. In the address selection screen 800, various pieces of information indicated in a region 801, an OK button 802, and a cancel button 803 are displayed.

The region 801 is a region in which addresses are displayed in a list manner, and includes pieces of information corresponding to respective items of selection, number, type, name, and destination. In the item of selection, radio buttons which allow the user to select only one address from among a plurality of addresses are displayed. In the item of number, management numbers of the respective addresses are displayed. The item of type is a region in which icons are displayed, and the icons differ depending on the types of addresses. In the item of name, names assigned to the respective addresses are displayed. In the item of destination, addresses are displayed.

In response to the OK button 802 being selected by the user, a destination selected in the region 801 is set as a destination which is employed when the one-touch transmission button is selected. In response to the cancel button 803 being selected by the user, the setting contents are discarded. Moreover, in response to the OK button 802 or the cancel button 803 being selected by the user, the button setting editing screen 600 is displayed.

FIG. 8B is a diagram illustrating an example of a destination registration screen. In the destination registration screen 810, a region 811, an entry field 812, a pull-down menu 813, an entry field 814, an entry field 815, an entry field 816, a checkbox 817, and a password 818 are displayed.

In the region 811, a unique management number assigned for managing an address is displayed.

The entry field 812 is an object used to enter the name of an address. The pull-down menu 813 is an object used to select a protocol used for transmission from SMB, FTP, and WebDAV.

The entry field 814 is an object used to enter a host name. For example, in the entry field 814, for example, the IP address of a file server serving as a destination is entered. In FIG. 8B, for the purpose of convenience, "file server" is entered as the host name.

The entry field 815 is an object used to enter a path to the folder serving as a destination. In FIG. 8B, a folder path (folder name) named as "medical questionnaire" is entered. The entry field 816 is an object used to enter the user name used for accessing a destination folder in which the user authentication function is turned on.

The checkbox 817 is an object used to set whether to use a password entered in the entry field 818 to access a destination folder. In a case where the checkbox 817 is checked as illustrated in FIG. 8B a password entered in the entry field 818 is used to access a destination folder.

In response to an OK button 819 being selected by the user, the contents displayed in the regions 811 to 818 are stored as setting of an address. In response to a cancel button 820 being selected by the user, the setting contents are discarded. Moreover, in response to the OK button 819 or the cancel button 820 being selected by the user, the destination registration screen 810 is closed.

FIG. 9, which comprises FIGS. 9A and 9B, is a diagram illustrating an example of a flow of screens displayed when image data generated by reading an image of a document with a scanner is transmitted. The screens illustrated in FIG. 9 are screens which are displayed on the touch panel 410.

When the user selects the scan button 402 in the home screen 400, a screen 901 used to select a type of scan is displayed. In the screen 901 used to select a type of scan, options such as "file" and "USB memory" are displayed. Furthermore, in the screen 901 used to select a type of scan, an option such as "e-mail" for transmitting image data via e-mail can also be displayed. When wanting to store image data in a USB memory (i.e., the external storage device 210), the user selects "USB memory". When wanting to transmit image data to the file server 103 or the online storage 105, the user selects "file".

With reference to FIG. 9, a flow of screens displayed in a case where the user selects "file" is described. When the user selects "file", a screen 902 used to designate a destination is displayed. The screen 902 used to designate a destination is divided into "destination setting" and "transmission setting", and, in "destination setting", the user can perform setting relating to a transmission destination of image data. In "transmission setting", the user can perform setting regarding image data, such as a reading size for a document and a format of image data.

Moreover, in "destination setting", the user can enter a destination serving as a transmission destination via a keyboard or can select a transmission destination from the address book. When the user selects "keyboard entry" of "destination setting", a keyboard entry screen 903 is displayed. In the keyboard entry screen 903, when entry of a character string is received and a confirm button is selected, the screen 902 used to designate a destination is displayed again. While, in the case of designating a transmission destination via a keyboard, the user also performs setting regarding a protocol, a host name, a folder path, a user name, and a password, the illustration thereof is omitted from FIG. 9.

When, in the screen 902 used to designate a destination, the user designates a destination, a "monochrome start" or "color start" button becomes selectable. The "monochrome start" button is a button which the user selects in the case of converting a document into image data in grayscale, and the "color start" button is a button which the user selects in the case of converting a document into image data in color.

When the user designates a destination via the screen 902 used to designate a destination and selects the "monochrome start" or "color start" button, reading of a document set on the scanner 207 is started, and then, image data is transmitted to the designated destination.

In the flow of screens illustrated in FIG. 9, in the case of designating a folder named with a patient number and transmitting image data to the designated folder, the user needs to perform many screen operations. For example, after performing a screen operation for displaying the screen 902 used to designate a destination, the user needs to enter, with use of keyboard entry, a server name, a protocol, a path to a folder named with a patient number, a user name, and a password. Alternatively, the user needs to previously register an address with regard to which a patient number is set to the item 815 for a path to the folder, using the screen illustrated in FIG. 8B. In any case, this flow of screens requires the user to take a lot of trouble to set different destinations for respective patients.

Figure 10:
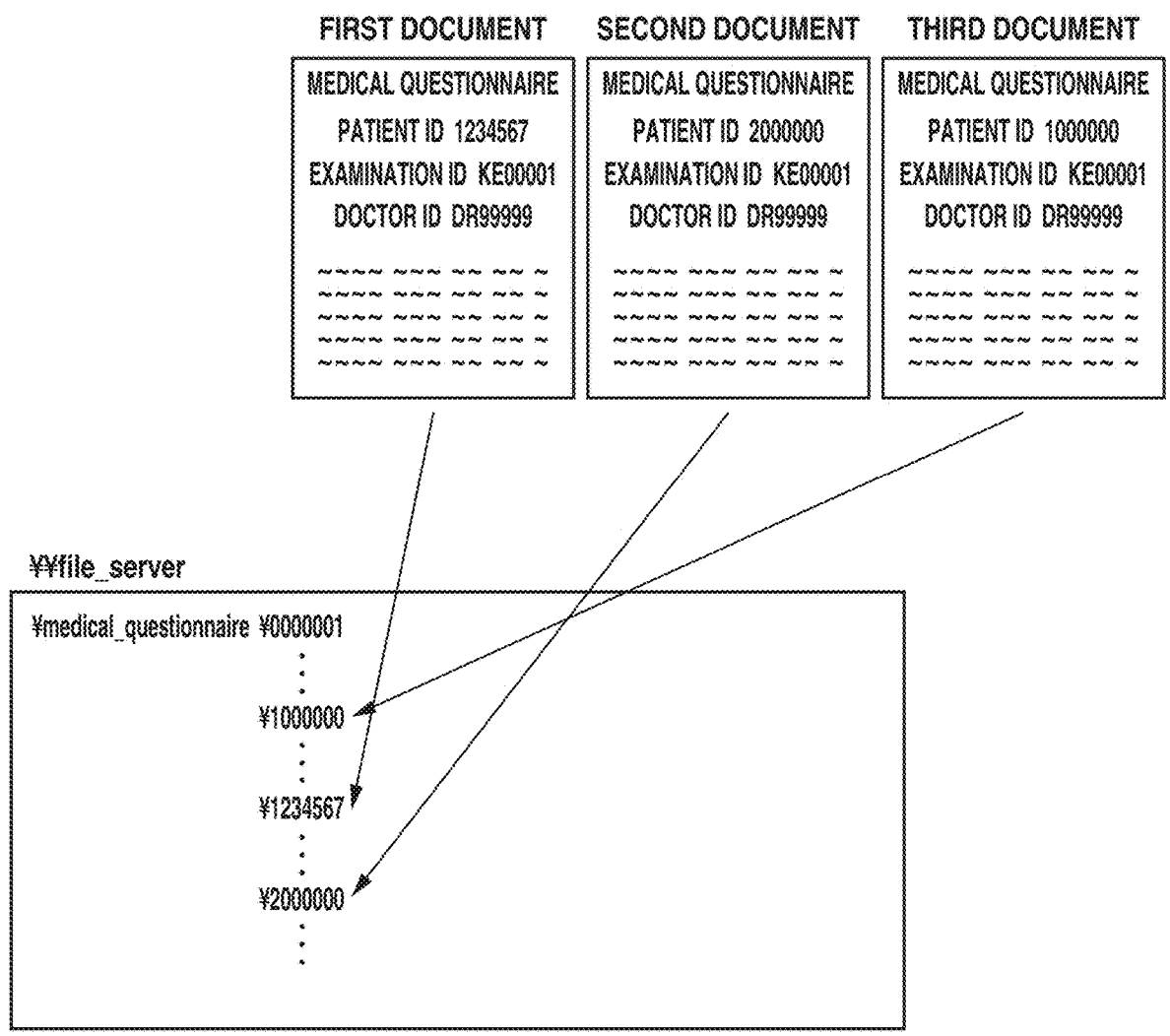
FIG. 10 is a diagram illustrating an example of storing electronic files that are based on a plurality of documents in respective different storage locations.

FIG. 10 is a diagram illustrating an example of storing respective electronic files (including pieces of image data) generated based on a plurality of documents in separate storage destinations. Different patient identifiers (ID) are described in respective three documents, thus aiming at storing each electronic file in a folder with the same name as the patient ID described in each document. Specifically, with regard to the first document, since the patient ID is "1234567", an electronic file obtained by conversion from the document is to be stored in "\\file_server\medical_questionnaire\1234567". With regard to the second document, since the patient ID is "2000000", an electronic file obtained by conversion from the document is to be stored in "\\file_server\medical_questionnaire\2000000". With regard to the third document, since the patient ID is "1000000", an electronic file obtained by conversion from the document is to be stored in "\\file_server\medical_questionnaire\1000000".

In an apparatus in which the user is allowed to select, after reading of documents, character strings used for storage destinations for storing image data in a plurality of folders, the user may want to do with issuing a reading instruction once for reading documents.

An apparatus discussed in Japanese Patent Application Laid-Open No. 2010-141636 enables storing image data in a plurality of folders with a single reading instruction, but does not allow the user to select character strings after reading of documents and thus requires the user to perform pre-registration.

Therefore, for example, the types of documents intended to be read by an image processing apparatus are not the fixed ones, and a new type of document may be intended to be read. Since the apparatus discussed in Japanese Patent Application Laid-Open No. 2010-141636 requires the user to perform pre-registration, if the user forgets to perform pre-registration before causing the image processing apparatus to read a new type of document, it is impossible to store image data in a correct storage destination.

Performing the following processing to address this issue enables, in an apparatus in which the user is allowed to select, after reading of documents, character strings used for storage destinations for storing image data in a plurality of folders, the user to do without issuing a reading instruction a plurality of times for reading documents.

Figure 11:
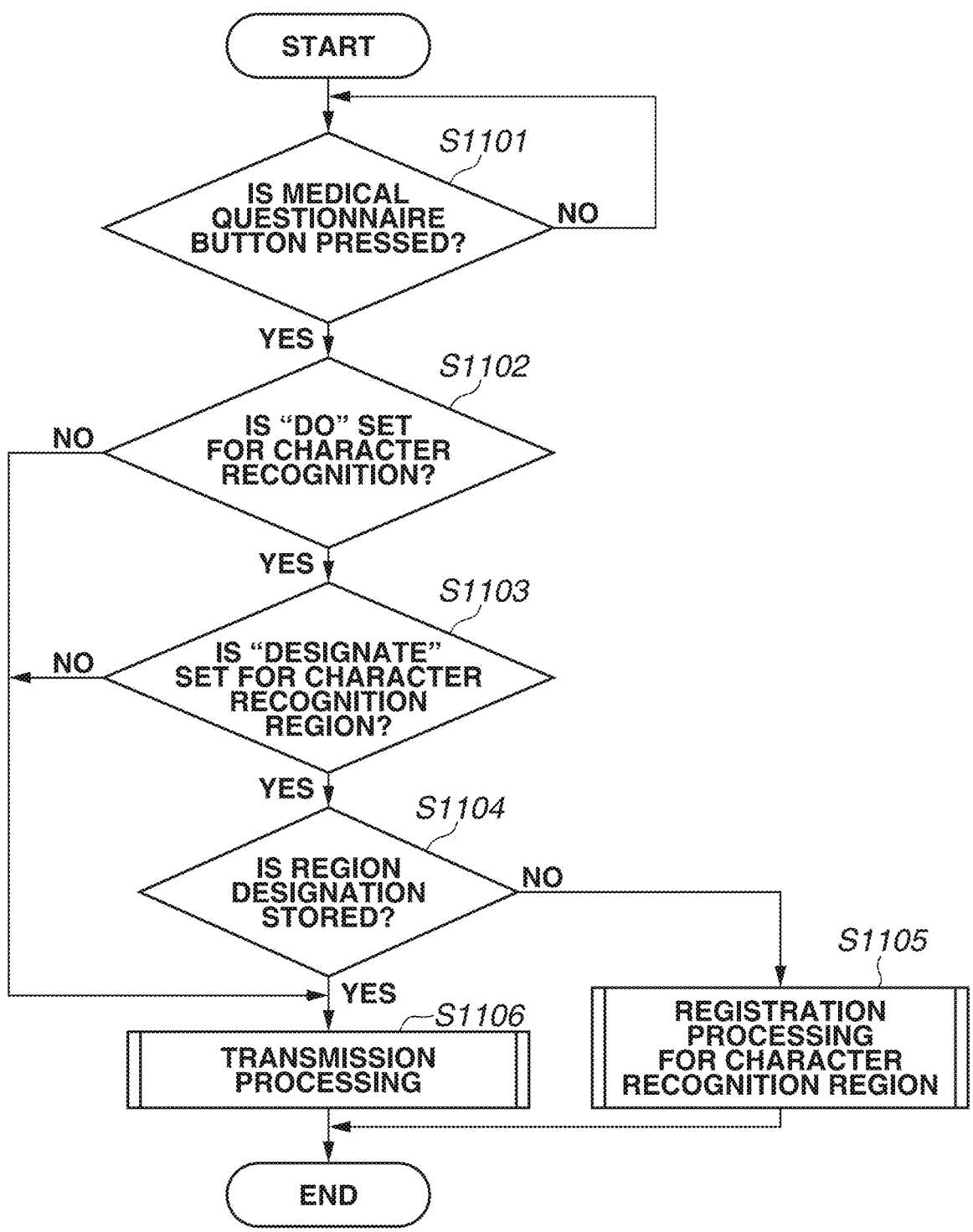
FIG. 11 is a flowchart illustrating an example of processing which is performed when a medical questionnaire button has been selected.

FIG. 11 is a flowchart illustrating an example of processing which is performed when the medical questionnaire button has been selected. The processing illustrated in the flowchart of FIG. 11 is implemented by the CPU 201 reading out a program stored in the ROM 202 onto the RAM 203 and executing the read-out program. Moreover, the flowchart of FIG. 11 is started in response to the home screen 400 being displayed on the touch panel 410.

In step S1101, the CPU 201 determines whether the medical questionnaire button 405 has been selected. If it is determined that the medical questionnaire button 405 has been selected (YES in step S1101), the processing proceeds to step S1102. If not so (NO in step S1101), the processing returns to step S1101.

In step S1102, the CPU 201 determines whether "do" is set in the pull-down menu 704 illustrated in FIG. 7A. If it is determined that "do" is set (YES in step S1102), the processing proceeds to step S1103. If not so (NO in step S1102), the processing proceeds to step S1106.

In step S1103, the CPU 201 determines whether "designate" is set in the pull-down menu 705 illustrated in FIG. 7A. If it is determined that "designate" is set (YES in step S1103), the processing proceeds to step S1104. If not so (NO in step S1103), the processing proceeds to step S1106.

In step S1104, the CPU 201 determines whether information regarding a character recognition region is previously stored in the storage 204. If it is determined that information regarding a character recognition region is previously stored (YES in step S1104), the processing proceeds to step S1106. If not so (NO in step S1104), the processing proceeds to step S1105.

In step S1105, the CPU 201 performs registration processing for a character recognition region. Details of the registration processing for a character recognition region are described below with reference to FIG. 12. Upon completion of the registration processing for a character recognition region, the processing ends.

In step S1106, the CPU 201 performs transmission processing for transmitting image data generated by reading a document. Details of the transmission processing are described below with reference to FIG. 14. Upon completion of the transmission processing, the processing ends.

Figure 12:
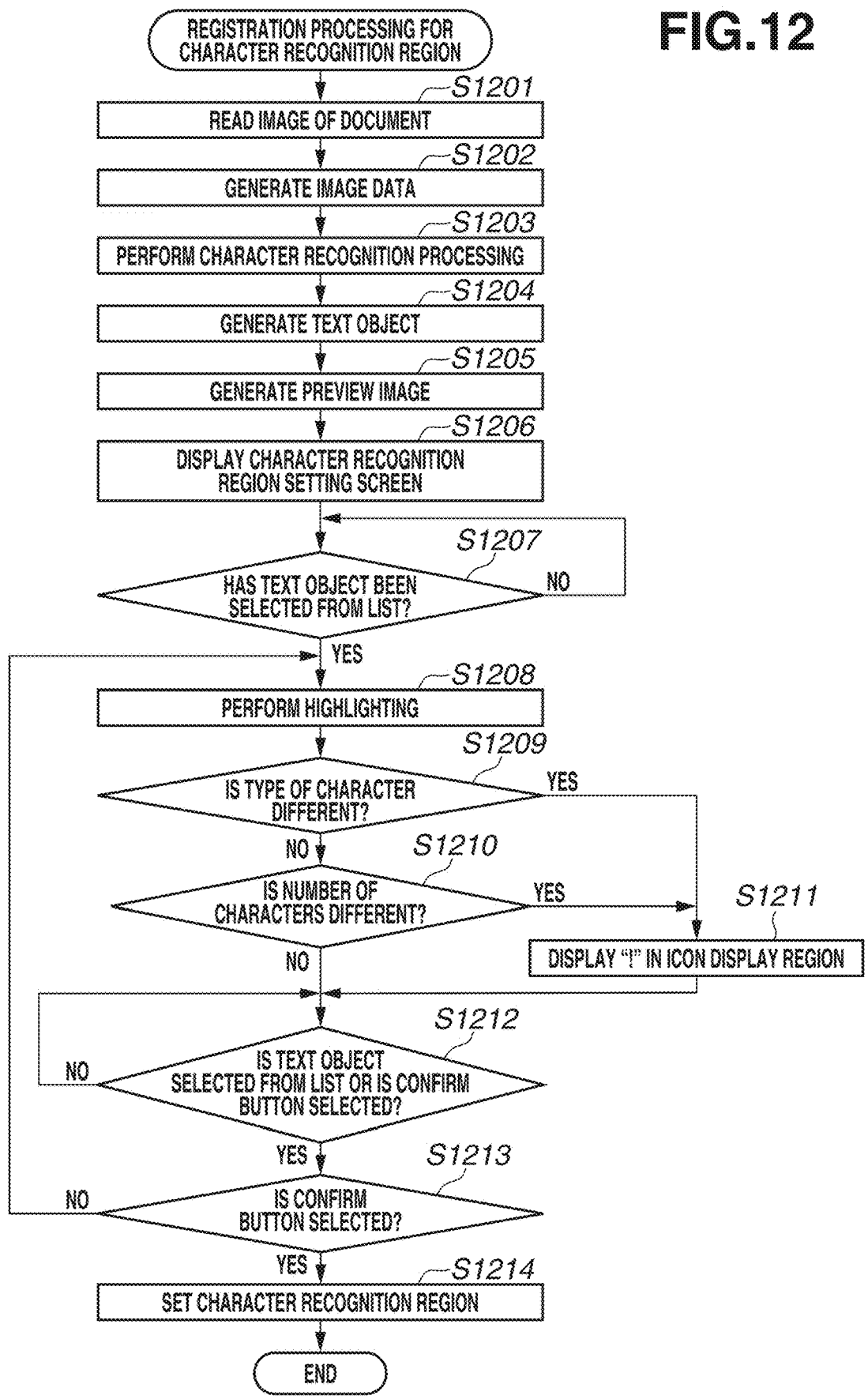
FIG. 12 is a flowchart illustrating an example of registration processing for character recognition region illustrated in FIG. 11.

FIG. 12 is a flowchart illustrating an example of the registration processing for character recognition region illustrated in FIG. 11. The processing illustrated in the flowchart of FIG. 12 is implemented by the CPU 201 reading out a program stored in the ROM 202 onto the RAM 203 and executing the read-out program. Moreover, the flowchart of FIG. 12 is started in response to it being determined, in processing in step S1104 illustrated in FIG. 11, that information regarding a character recognition region is still not stored.

In step S1201, the CPU 201 controls the scanner 207 in such a way as to cause the scanner 207 to read an image of a document set in the MFP 101.

In step S1202, the CPU 201 generates image data based on the image read in step S1201.

In step S1203, the CPU 201 performs character recognition processing on the image data generated in step S1202.

In step S1204, the CPU 201 generates a text object using a character string obtained as a result of the character recognition processing performed in step S1203. Moreover, the CPU 201 appends, to the text object, region information relating to a character string corresponding to the text object.

In step S1205, the CPU 201 generates a preview image, which is to be displayed on the operation unit 205, based on the generated image data.

In step S1206, the CPU 201 displays, on the operation unit 205, a setting screen for character recognition region with use of the text object generated in step S1204 and the preview image generated in step S1205. An example of the setting screen which is displayed here is illustrated in FIG. 13.

Figure 13:
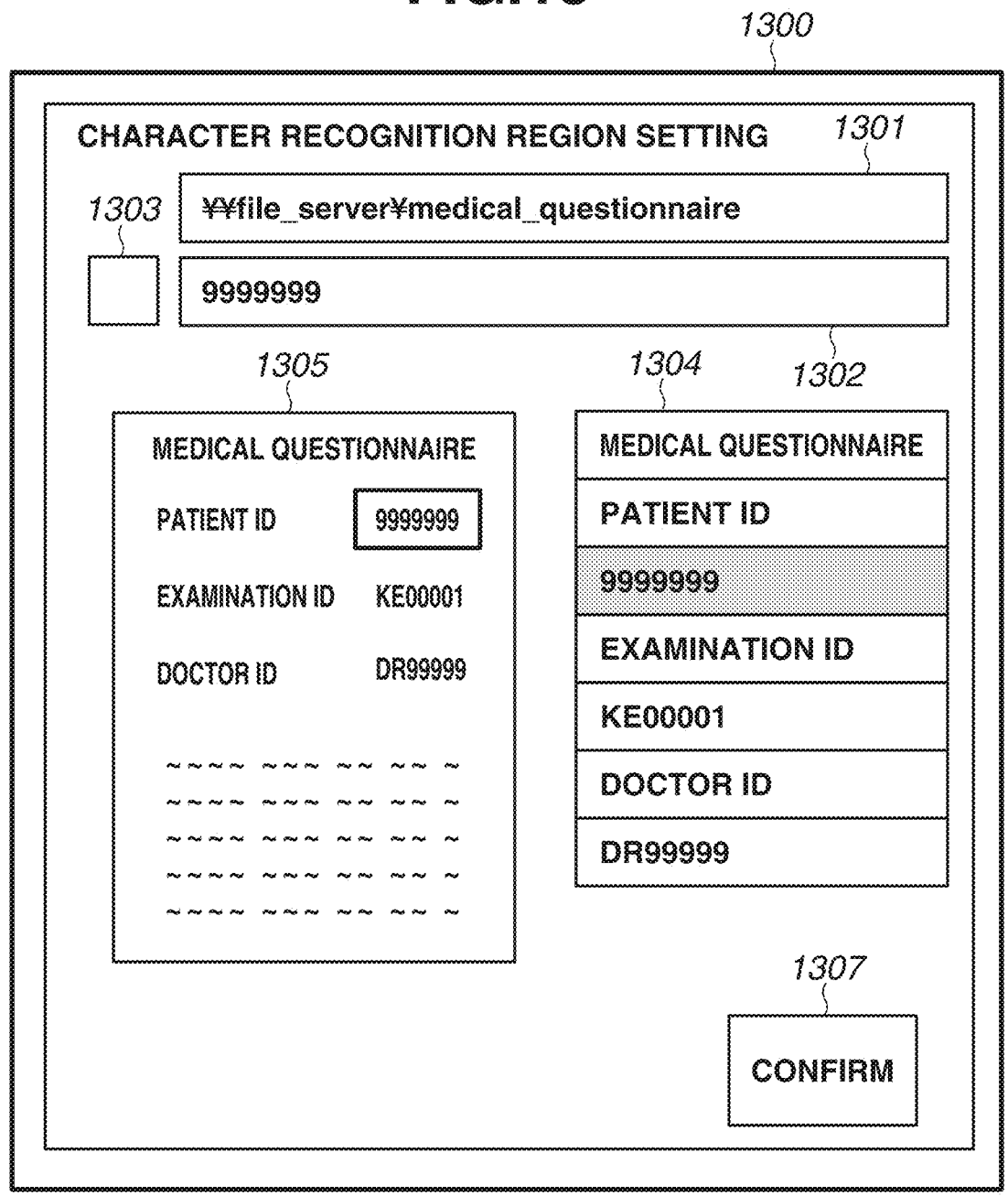
FIG. 13 is a diagram illustrating an example of a setting screen for a character recognition region.

FIG. 13 is a diagram illustrating an example of the setting screen for character recognition region. The setting screen for character recognition region 1300 is a screen for enabling setting a character recognition region while displaying a preview image that is based on an image of the read document.

A region 1301 is a region in which the transmission destination displayed in the region 609 is displayed. In the case of selection of the medical questionnaire button 405, "\\file_server\medical_questionnaire" is displayed in the region 1301.

In an entry field 1302, a character string indicated by a text object selected by the user from a list 1304 is displayed. Moreover, in the entry field 1302, a character string entered by the user via, for example, a software keyboard can be entered.

A region 1303 is a region in which an icon such as "! (exclamation mark)" is displayed. The list 1304 is a list in which one text object is included per line. In the list 1304, a gathering of recognized characters (character clipping rectangles) the distance between which is a predetermined distance or less is treated as a character string, and one character string is displayed as a text object included in the list 1304. Moreover, in the list 1304, text objects from a text object corresponding to a character clipping rectangle located at the upper left to a text object corresponding to a character clipping rectangle located at the lower right are displayed.

When a text object in the list 1304 is selected, the background of the selected text object is highlighted. Moreover, a character string corresponding to the selected text object is displayed in the region 1302.

A preview image 1305 is a raw image obtained by converting image data generated by reading a document into data used for display on the operation unit 205. When the user selects a text object in the list 1304, a corresponding portion in the preview image 1305 becomes red as indicated by a highlighted rectangle.

A confirm button 1307 is a button which, when selected by the user, is used to set rectangle region information corresponding to the selected text object as a character recognition region for the medical questionnaire button 405. Moreover, when the confirm button 1307 is selected, the home screen 400 is displayed on the operation unit 205.

Here, description refers back to the flowchart of FIG. 12. In step S1207, the CPU 201 determines whether a text object has been selected from the list 1304. If it is determined that a text object has been selected (YES in step S1207), the processing proceeds to step S1208. If not so (NO in step S1207), the processing returns to step S1207.

In step S1208 the CPU 201 performs highlighting of the selected text object and a character string in the preview image corresponding to the selected text object as illustrated in FIG. 13. Moreover, the CPU 201 displays a character string corresponding to the selected text object in the region 1302.

In step S1209, the CPU 201 determines whether the type of a character string corresponding to the selected text object is different from the type selected in the pull-down menu 701. If it is determined that the types are different from each other (YES in step S1209), the processing proceeds to step S1211. If not so (NO in step S1209), the processing proceeds to step S1210.

In step S1210, the CPU 201 determines whether the number of characters of the character string corresponding to the selected text object is different from the number of characters set in the entry field 702. If it is determined that the numbers of characters are different from each other (YES in step S1210), the processing proceeds to step S1211. If not so (NO in step S1210), the processing proceeds to step S1212.

In step S1211, the CPU 201 displays an icon such as "! (exclamation mark)" for issuing a warning in the icon display region 1303.

In step S1212, the CPU 201 determines whether a text object has been selected from the list 1304 or the confirm button 1307 has been selected. If it is determined that a text object or the confirm button 1307 has been selected (YES in step S1212), the processing proceeds to step S1213. If not so (NO in step S1212), the processing returns to step S1212.

In step S1213, the CPU 201 determines whether the confirm button 1307 has been selected. If it is determined that the confirm button 1307 has been selected (YES in step S1213), the processing proceeds to step S1214. If not so (NO in step S1213), in other words, if it is determined that a text object has been selected from the list 1304, the processing returns to step S1208. In this case, highlighting of the text object selected last time is reset. Moreover, the character string previously displayed in the region 1302 is also reset.

In step S1214, the CPU 201 stores, in the storage 204, coordinate information about a rectangle region corresponding to a character string which is being displayed in the region 1301, as a region for character recognition processing, and, then, the processing ends.

Figure 14:
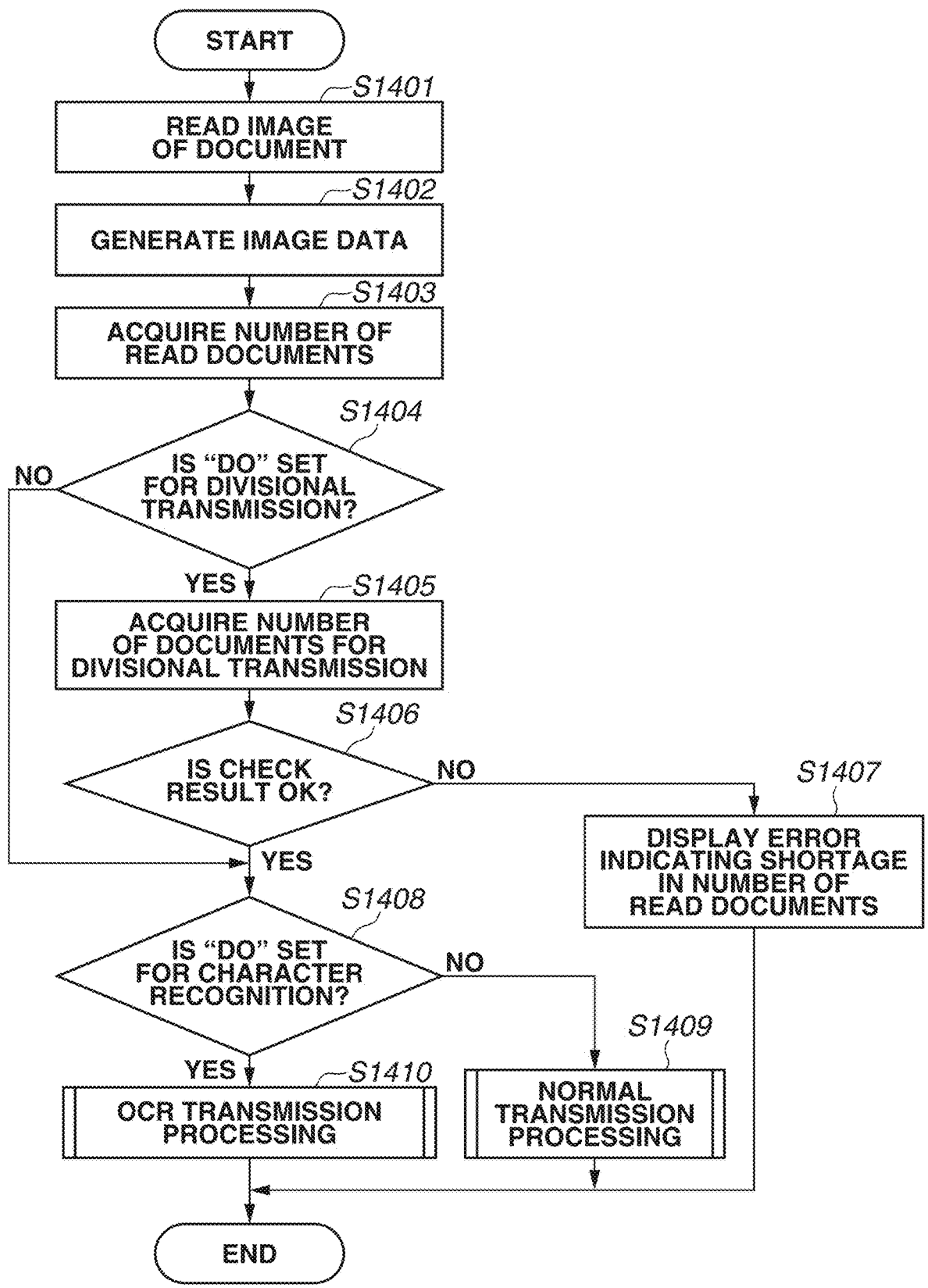
FIG. 14 is a flowchart illustrating an example of transmission processing.

FIG. 14 is a flowchart illustrating an example of the transmission processing. The processing illustrated in the flowchart of FIG. 14 is implemented by the CPU 201 reading out a program stored in the ROM 202 onto the RAM 203 and executing the read-out program. Moreover, the flowchart of FIG. 14 is started in response to it being determined, in processing in step S1104 illustrated in FIG. 11, that information regarding a character recognition region is stored. Alternatively, the flowchart of FIG. 14 is started in response to it being determined, in processing in step S1103, that "designate" is not set. Alternatively, the flowchart of FIG. 14 is started in response to it being determined, in processing in step S1102, that "do" is not set.

In step S1401, the CPU 201 controls the scanner 207 in such a way as to cause the scanner 207 to read an image of a document set in the MFP 101.

In step S1402, the CPU 201 generates image data based on the image read in step S1401.

In step S1403, the CPU 201 acquires the number of read documents.

In step S1404, the CPU 201 determines whether the checkbox 602 illustrated in FIG. 6 is checked and, thus, "do divisional transmission" is set. If it is determined that "do divisional transmission" is set (YES in step S1404), the processing proceeds to step S1405. If not so (NO in step S1404), the processing proceeds to step S1408.

In step S1405, the CPU 201 acquires the number of documents for divisional transmission entered in the entry field 603.

In step S1406, the CPU 201 determines whether the number of read documents is exactly divisible by the number of documents for divisional transmission acquired in step S1405. If it is determined that the number of read documents is exactly divisible by the number of documents for divisional transmission (YES in step S1406), the processing proceeds to step S1408. If not so (NO in step S1406), the processing proceeds to step S1407. For example, in a case where the number of read documents is three and the number of documents for divisional transmission is two, the number of read documents is not exactly divisible by the number of documents for divisional transmission, so that the processing proceeds to step S1407.

In step S1407, the CPU 201 controls the operation unit 205 to cause the operation unit 205 to display information indicating that the number of read documents is short. Furthermore, while, in the first exemplary embodiment, in a case where the number of read documents is not exactly divisible by the number of documents for divisional transmission acquired in step S1405, error information indicating that the number of read documents is short is displayed, the first exemplary embodiment is not limited to this. For example, in a case where the number of read documents is four and the number of documents for divisional transmission is three, the read documents can be divided into three documents and one document in the order of reading thereof to be divisionally transmitted or can be divided into an optional combination of numbers.

In step S1408, the CPU 201 determines whether "do" is set in the pull-down menu 704 illustrated in FIG. 7A. If it is determined that "do" is set (YES in step S1408), the processing proceeds to step S1410. If not so (NO in step S1408), the processing proceeds to step S1409.

In step S1409, the CPU 201 performs normal transmission processing. Details of the normal transmission processing are described below with reference to FIG. 15.

In step S1410, the CPU 201 performs OCR transmission processing. An example of the OCR transmission processing is described below with reference to FIG. 17.

Figure 15:
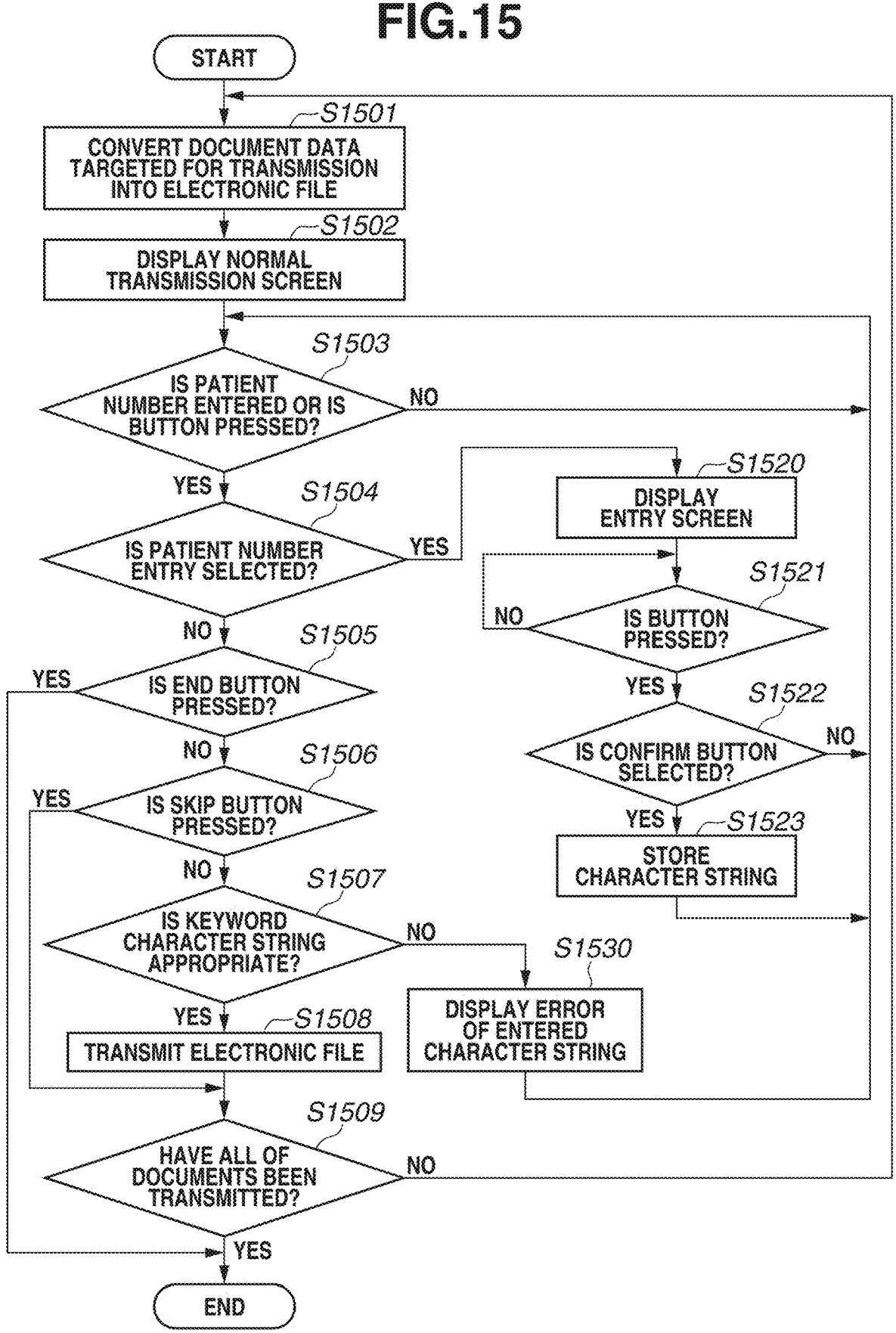
FIG. 15 is a flowchart illustrating an example of normal transmission processing.

FIG. 15 is a flowchart illustrating an example of the normal transmission processing. The processing illustrated in the flowchart of FIG. 15 is implemented by the CPU 201 reading out a program stored in the ROM 202 onto the RAM 203 and executing the read-out program. The flow illustrated in FIG. 15 is started in response to it being determined, in processing in step S1408 illustrated in FIG. 14, that "do" is not set in the pull-down menu 704 illustrated in FIG. 7A.

In step S1501, the CPU 201 generates one electronic file (including image data) by converting image data generated in step S1402 in units of the number of documents for divisional transmission. In the first exemplary embodiment, since "1" is entered in the entry field 603, the CPU 201 generates one electronic file from image data on a document-by-document basis. Here, the format of an electronic file to be generated corresponds to a format selected in the pull-down menu 611. In the first exemplary embodiment, since "PDF" is set in the pull-down menu 611, a PDF file is generated.

In step S1502, the CPU 201 controls the operation unit 205 to cause the operation unit 205 to display a normal transmission screen. Here, an example of the normal transmission screen to be displayed is illustrated in FIG. 16A.

FIG. 16A is a diagram illustrating an example of the normal transmission screen. The normal transmission screen 1600 illustrated in FIG. 16A is displayed on the operation unit 205. A message region 1601 is a region in which a character string entered in the entry field 703 is displayed. In the first exemplary embodiment, a character string such as "Please enter the patient number." is displayed. An entry field 1602 is an entry field used to designate the name of a folder in which to store image data generated by image reading. In the first exemplary embodiment, the entered patient number serves as the name of such a folder. When the entry field 703 is selected, an entry screen 1610 illustrated in FIG. 16B is displayed on the operation unit 205.

The entry screen 1610 is a screen used to receive entry of a keyword. A message region 1611 is a region used to display the type of character and the number of characters set in the pull-down menu 701 and the entry field 702. An entry field 1612 is an entry field used to receive entry of a keyword, and, here, receives entry of 7-digit numerals. Here, a configuration in which entry of characters the number of which exceeds a predetermined number of characters or entry of characters the type of which differs from the predetermined types of characters is not accepted can be employed, or a configuration in which, after reception of such characters, an error message is communicated can be employed. A confirm button 1613 is a button which, when selected by the user, is used to reflect a character string entered at that point in the entry field 1602. Moreover, the confirm button 1613 is used to store such a character string in the RAM 203 or the storage 204. A cancel button 1614 is a button which, when selected by the user, is used to close the entry screen 1610 without storing the character string entered in the entry field 1612.

A transmit button 1603 is a button which, when selected by the user, is used to transmit image data generated by image reading to a folder path obtained by adding a character string displayed in the entry field 1602 to a hierarchical layer just below the folder path (destination) displayed in the region 609. Specifically, image data is transmitted to (stored in) a folder path "\\file_server\medical_questionnaire\0123456". Furthermore, the transmission destination (storage destination) of electronic data (image data) in the transmission processing can be the storage 204 included in the MFP 101.

A skip button 1604 is a button which, when selected by the user, is used to display a screen for performing transmission processing for a next document. An end button 1605 is a button which, when selected by the user, is used to stop the transmission processing and close the normal transmission screen 1600.

Here, description refers back to the flowchart of FIG. 15. In step S1503, the CPU 201 determines whether a button or entry field displayed in the normal transmission screen 1600 has been selected. If it is determined that such a button or entry field has been selected (YES in step S1503), the processing proceeds to step S1504. If not so (NO in step S1503), the processing returns to step S1503, in which the CPU 201 repeats the processing.

In step S1504, the CPU 201 determines whether the entry field 1602 has been selected. If it is determined that the entry field 1602 has been selected (YES in step S1504), the processing proceeds to step S1520. If not so (NO in step S1504), the processing proceeds to step S1505.

In step S1505, the CPU 201 determines whether the end button 1605 has been selected. If it is determined that the end button 1605 has been selected (YES in step S1505), the processing ends. If not so (NO in step S1505), the processing proceeds to step S1506.

In step S1506, the CPU 201 determines whether the skip button 1604 has been selected. If it is determined that the skip button 1604 has been selected (YES in step S1506), the processing proceeds to step S1509. If not so (NO in step S1506), in other words, if it is determined that the transmit button 1603 has been selected, the processing proceeds to step S1507.

In step S1507, the CPU 201 determines whether a character string displayed in the entry field 1602 satisfies a predetermined condition (the type of character and the number of characters) set in the pull-down menu 701 and the entry field 702. If it is determined that the character string satisfies the predetermined condition (YES in step S1507), the processing proceeds to step S1508. If not so (NO in step S1507), the processing proceeds to step S1530.

In step S1530, the CPU 201 controls the operation unit 205 to cause the operation unit 205 displays information indicating an error caused by the entered character string not satisfying the predetermined condition.

In step S1508, the CPU 201 controls the network I/F 208 to transmit an electronic file generated in step S1501 to a folder path obtained by adding a character string displayed in the entry field 1602 to a hierarchical layer just below the folder path (destination) displayed in the region 609. Furthermore, here, after generating a transmission destination folder, the CPU 201 transmits the electronic file. Moreover, the file name of the electronic file can be any file name as long as it is unique. For example, if the time at which step S1508 was started is Oct. 10, 2018 at 12:23:56, the file name is "20181010122356.pdf".

In step S1509, the CPU 201 determines whether electronic files of all of the read documents have been transmitted. If it is determined that the electronic files of all of the read documents have been transmitted (YES in step S1509), the processing ends. If not so (NO in step S1509), the processing returns to step S1501. In this way, according to the first exemplary embodiment, electronic files of a plurality of documents can be transmitted on a document-by-document basis.

Here, the case where, in step S1504, it is determined that the entry field 1602 has been selected is described. In step S1520, the CPU 201 controls the operation unit 205 to cause the operation unit 205 to display the entry screen 1610.

In step S1521, the CPU 201 determines whether a button has been selected. If it is determined that a button has been selected (YES in step S1521), the processing proceeds to step S1522. If not so (NO in step S1521), the processing returns to step S1521.

In step S1522 the CPU 201 determines whether the confirm button 1613 has been selected. If it is determined that the confirm button 1613 has been selected (YES in step S1522), the processing proceeds to step S1523. If not so (NO in step S1522), the processing returns to step S1503.

In step S1523, the CPU 201 stores a character string entered in the entry field 1612 in the RAM 203 or the storage 204, and controls the operation unit 205 to cause the operation unit 205 to close the entry screen 1610 and display the normal transmission screen 1600. Then, the CPU 201 controls the operation unit 205 to display the stored character string in the entry field 1602.

Figure 17:
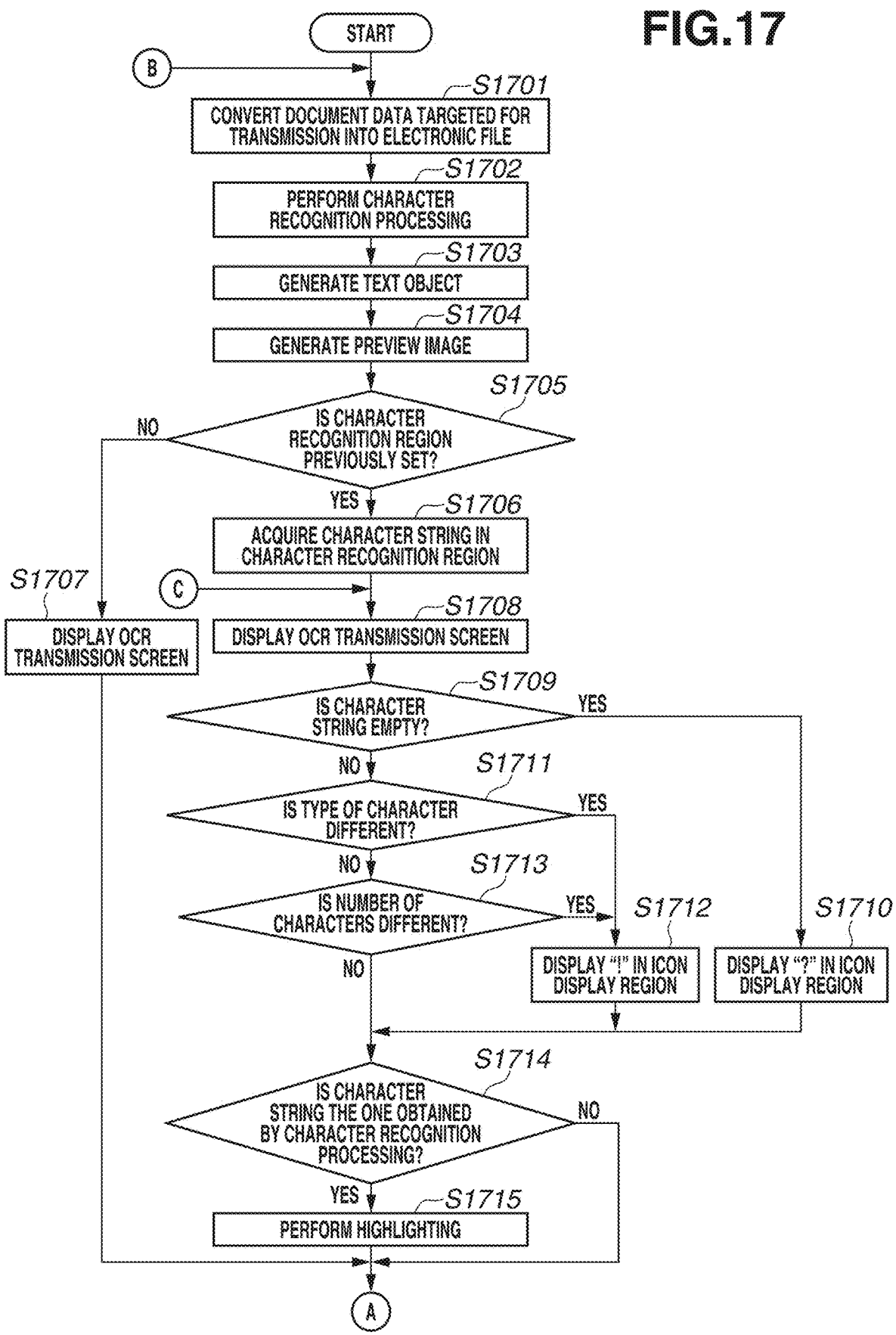
FIG. 17 is a flowchart illustrating an example of optical character recognition (OCR) transmission processing.

FIG. 17 is a flowchart illustrating an example of the OCR transmission processing. The processing illustrated in the flowchart of FIG. 17 is implemented by the CPU 201 reading out a program stored in the ROM 202 onto the RAM 203 and executing the read-out program. The flow illustrated in FIG. 17 is started in response to it being determined, in processing in step S1408 illustrated in FIG. 14, that "do" is set in the pull-down menu 704 illustrated in FIG. 7A.

In step S1701, the CPU 201 generates one electronic file (including image data) by converting image data generated in step S1402 in units of the number of documents for divisional transmission. In the first exemplary embodiment, since "1" is entered in the entry field 603, the CPU 201 generates one electronic file from image data on a document-by-document basis. Here, the format of an electronic file to be generated corresponds to a format selected in the pull-down menu 611. In the first exemplary embodiment, since "PDF" is set in the pull-down menu 611, a PDF file is generated.

In step S1702, the CPU 201 performs character recognition processing on image data generated in step S1202. This processing is similar processing to that in step S1203, and is, therefore, omitted from description here.

In step S1703, the CPU 201 generates a text object using a character string obtained as a result of the character recognition processing performed in step S1702. Moreover, the CPU 201 appends, to the text object, region information about a character string corresponding to the text object.

In step S1704, the CPU 201 generates a preview image, which is to be displayed on the operation unit 205, based on the generated image data.

In step S1705, the CPU 201 determines whether a character recognition region is previously set. If it is determined that a character recognition region is previously set (YES in step S1705), the processing proceeds to step S1706. If not so (NO in step S1705), the processing proceeds to step S1707. Furthermore, this determination as to whether a character recognition region is previously set can be performed before character recognition processing is performed. For example, if it is determined that a character recognition region is previously set, the CPU 201 can perform character recognition processing on only the set character recognition region.

In step S1706, the CPU 201 acquires a character string in the previously set character recognition region, and stores the acquired character string in the RAM 203. Specifically, the CPU 201 acquires the position (information regarding starting point coordinates and ending point coordinates) of a character recognition target region stored in the storage 204 and extracts a character string situated at the acquired position.

Figure 19:
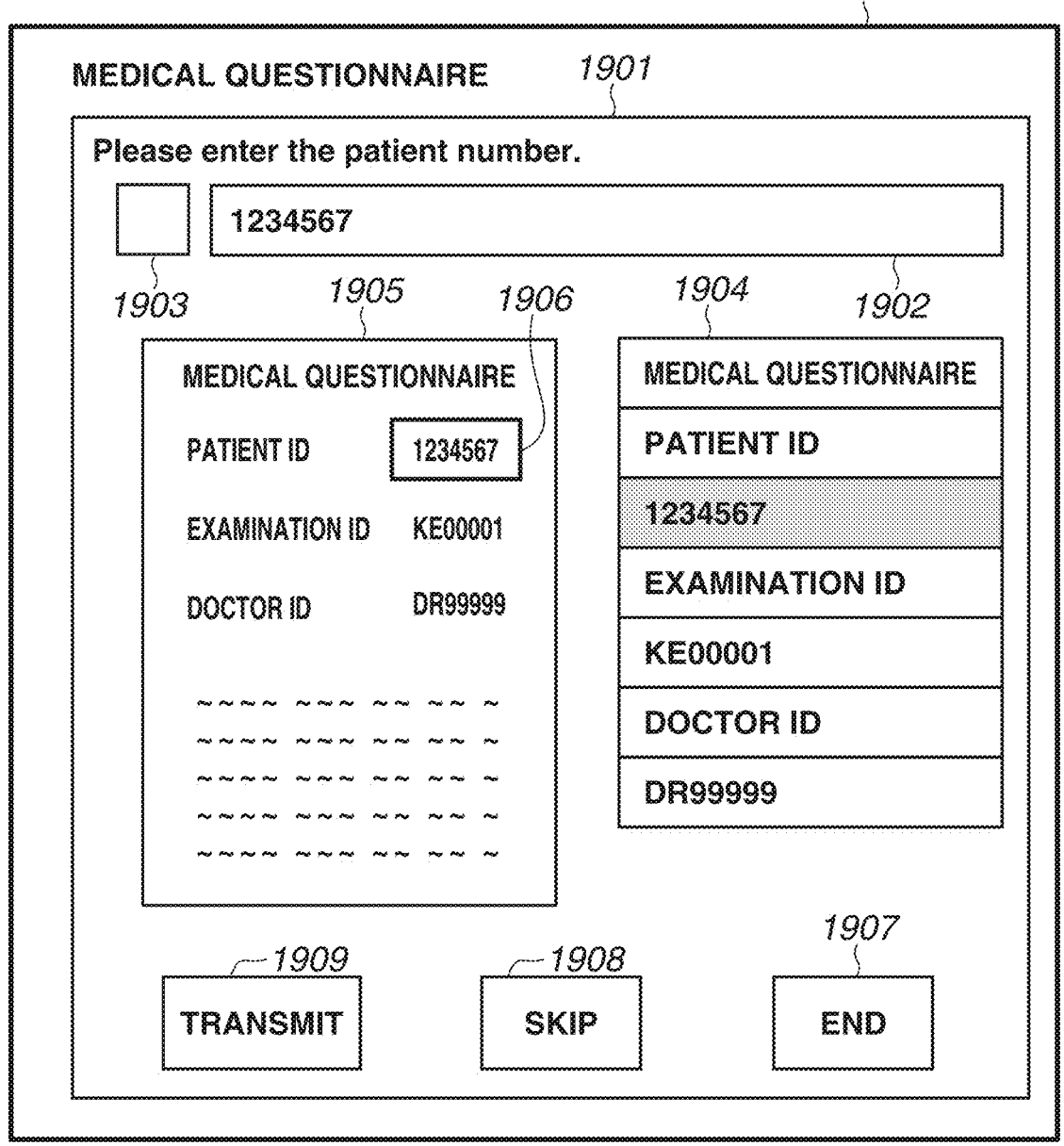
FIG. 19 is a diagram illustrating an example of an OCR transmission screen.

In step S1707, the CPU 201 controls the operation unit 205 to display an OCR transmission screen. In step S1708, the CPU 201 also performs similar processing to that in step S1707. An example of the OCR transmission screen, which is displayed in step S1707 or S1708, is illustrated in FIG. 19. FIG. 19 is a diagram illustrating an example of the OCR transmission screen. The OCR transmission screen 1900 is a screen which is displayed on the operation unit 205. A message region 1901 is a region in which a character string entered in the entry field 703 is displayed. In the first exemplary embodiment, a character string such as "Please enter the patient number." is displayed.

An entry field 1902 is an entry field used to designate the name of a folder in which to store image data generated by image reading. Moreover, when the entry field 1902 is selected, the entry screen 1610 illustrated in FIG. 16B is displayed to receive entry or editing of a character string.

An icon display region 1903 is a region in which to display an icon such as "! (exclamation mark)" or "? (question mark)". An example in which "! (exclamation mark)" is displayed in the icon display region 1903 is described below with reference to FIG. 20. An example in which "? (question mark)" is displayed in the icon display region 1903 is described below with reference to FIG. 21.

A list 1904 is a list similar to the list 1304 in the setting screen 1300 illustrated in FIG. 13, and, in the list 1904, a gathering of recognized characters the distance between which is a predetermined distance or less is treated as a character string, and one character string is displayed as a text object included in the list 1904. A character string corresponding to a text object selected from the list 1904 is displayed in the entry field 1902. In the first exemplary embodiment, a text object "1234567" is selected and a character string "1234567" is displayed in the entry field 1902.

A preview image 1905 is a raw image obtained by converting image data generated by reading a document into data used for display on the operation unit 205. When the user selects a text object in the list 1904, a corresponding portion in the preview image 1905 becomes red as indicated by a highlighted rectangle 1906.

An end button 1907 is a button which, when selected by the user, is used to stop performing the OCR transmission processing. Moreover, when the end button 1907 is selected, various settings which have been set by that time (for example, a folder path which is set by selection of a text object) are cancelled. For example, setting values stored in the RAM 203 are cleared.

A skip button 1908 is a button which, when selected by the user, is used to skip transmission setting for image data corresponding to a preview image displayed at that time and then display a screen for performing transmission setting for next image data. In a case where the skip button 1908 has been selected, setting contents (for example, a folder path which is set by selection of a text object) set at that time can be kept stored in, for example, the RAM 203 or can be cleared. Moreover, a next preview image which is displayed when the skip button 1908 has been selected can be an image of a document read next to a document corresponding to an image displayed before the skip button 1908 is selected or can be a previous image. Moreover, such a next preview image can also be an image of an optionally determined document.

A transmit button 1909 is a button which, when selected by the user, is used to transmit image data corresponding to a preview image displayed at that time to a set destination. In the first exemplary embodiment, the image data is transmitted to a folder indicated by "\\file_server\medical_questionnaire\1234567". Furthermore, even in the OCR transmission screen 1900, a transmission destination displayed in the region 609 can be displayed as in the region 1301. On that occasion, in response to a text object in the list 1904 being selected by the user, a transmission destination (folder path) obtained by adding the character string of the selected text object to a hierarchical layer just below the displayed transmission destination is displayed as needed.

FIG. 20 is a diagram illustrating an example in which "! (exclamation mark)" is displayed in the icon display region 1903. In the entry field 1902, a character string "I234567" corresponding to a text object "I234567" selected from the list 1904 is displayed. In this example, since, as a result of character recognition processing, the number "1" has been falsely recognized as the letter "I" of the alphabet, such a character string "I234567" is displayed.

Since, in the first exemplary embodiment, the type of character and the number of characters set in the pull-down menu 701 and the entry field 702 are 7-digit numerals, in a case where a character string "I234567" including a character other than numerals is displayed in the entry field 1902, "! (exclamation mark)", which gives a warning, is displayed in the icon display region 1903.

Figure 21:
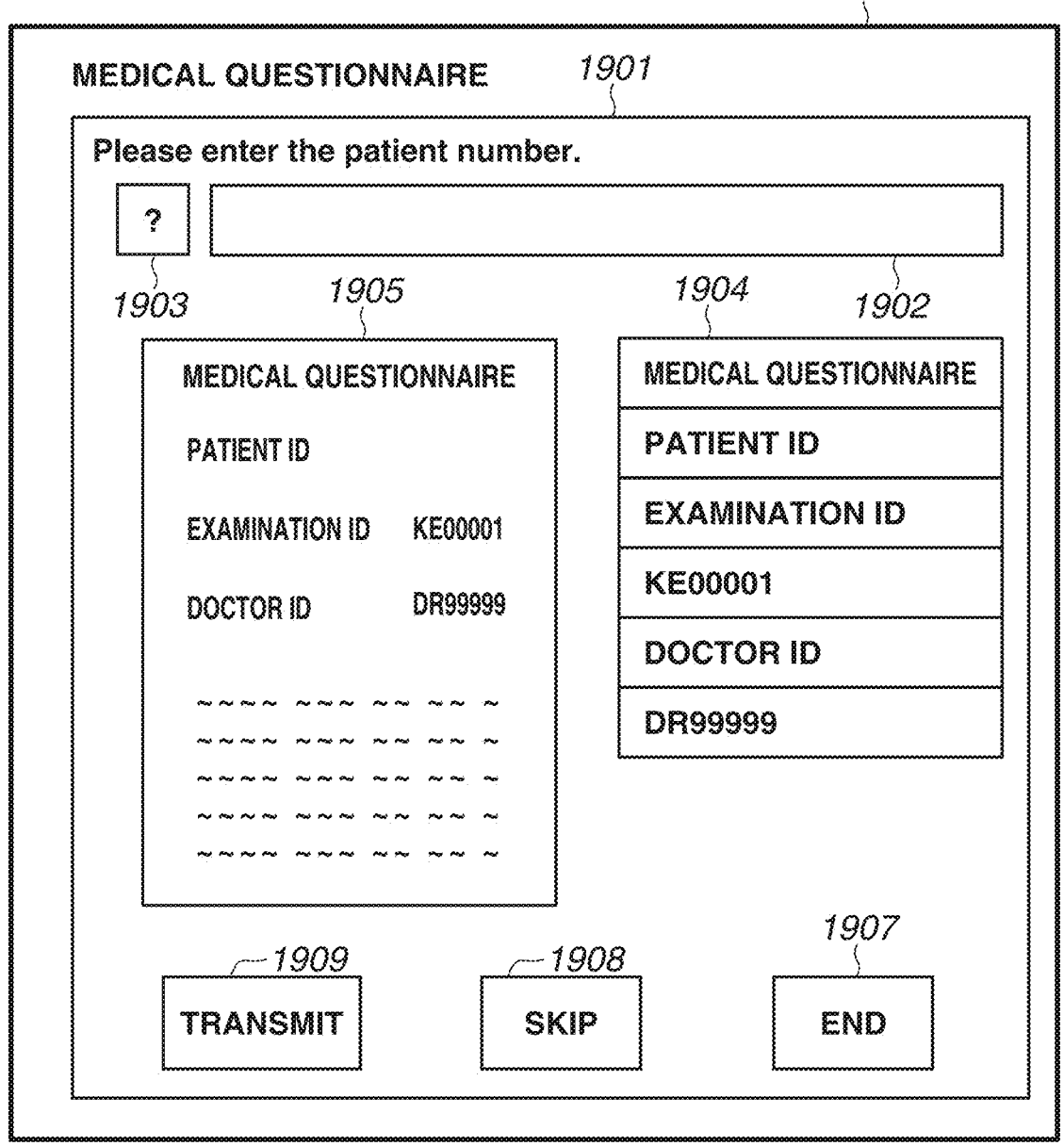
FIG. 21 is a diagram illustrating an example in which "? (question mark)" is displayed in the icon display region.

FIG. 21 is a diagram illustrating an example in which "? (question mark)" is displayed in the icon display region 1903. In a case where, as a result of character recognition processing performed in the set character recognition region, no characters have been obtained, none is displayed in the entry field 1902. In that case, "? (question mark)" is displayed in the icon display region 1903.

Here, description refers back to the flow illustrated in FIG. 17. In step S1709, the CPU 201 determines whether the character string is empty. If it is determined that the character string is empty (YES in step S1709), the processing proceeds to step S1710. If not so (NO in step S1709), the processing proceeds to step S1711.

In step S1710, the CPU 201 displays "? (question mark)" in the icon display region 1903 as illustrated in FIG. 21.

In step S1711, the CPU 201 determines whether the type of character set in advance and the type of character of the character string obtained as a result of character recognition processing are different from each other. If it is determined that the types of character are different from each other (YES in step S1711), the processing proceeds to step S1712. If not so (NO in step S1711), the processing proceeds to step S1713.

In step S1712, the CPU 201 displays "! (exclamation mark)" in the icon display region 1903 as illustrated in FIG. 20.

In step S1713, the CPU 201 determines whether the number of characters set in advance and the number of characters of the character string obtained as a result of character recognition processing are different from each other. If it is determined that the numbers of characters are different from each other (YES in step S1713), the processing proceeds to step S1712. If not so (NO in step S1713), the processing proceeds to step S1714.

In step S1714, the CPU 201 determines whether the character string determined in step S1713 is a character string acquired by character recognition processing. If it is determined that the character string is a character string acquired by character recognition processing (YES in step S1714), the processing proceeds to step S1715. If not so (NO in step S1714), the processing proceeds to step S1716.

In step S1715, the CPU 201 performs highlighting of a character string present on the preview image corresponding to the character string determined in step S1713.

Figure 18:
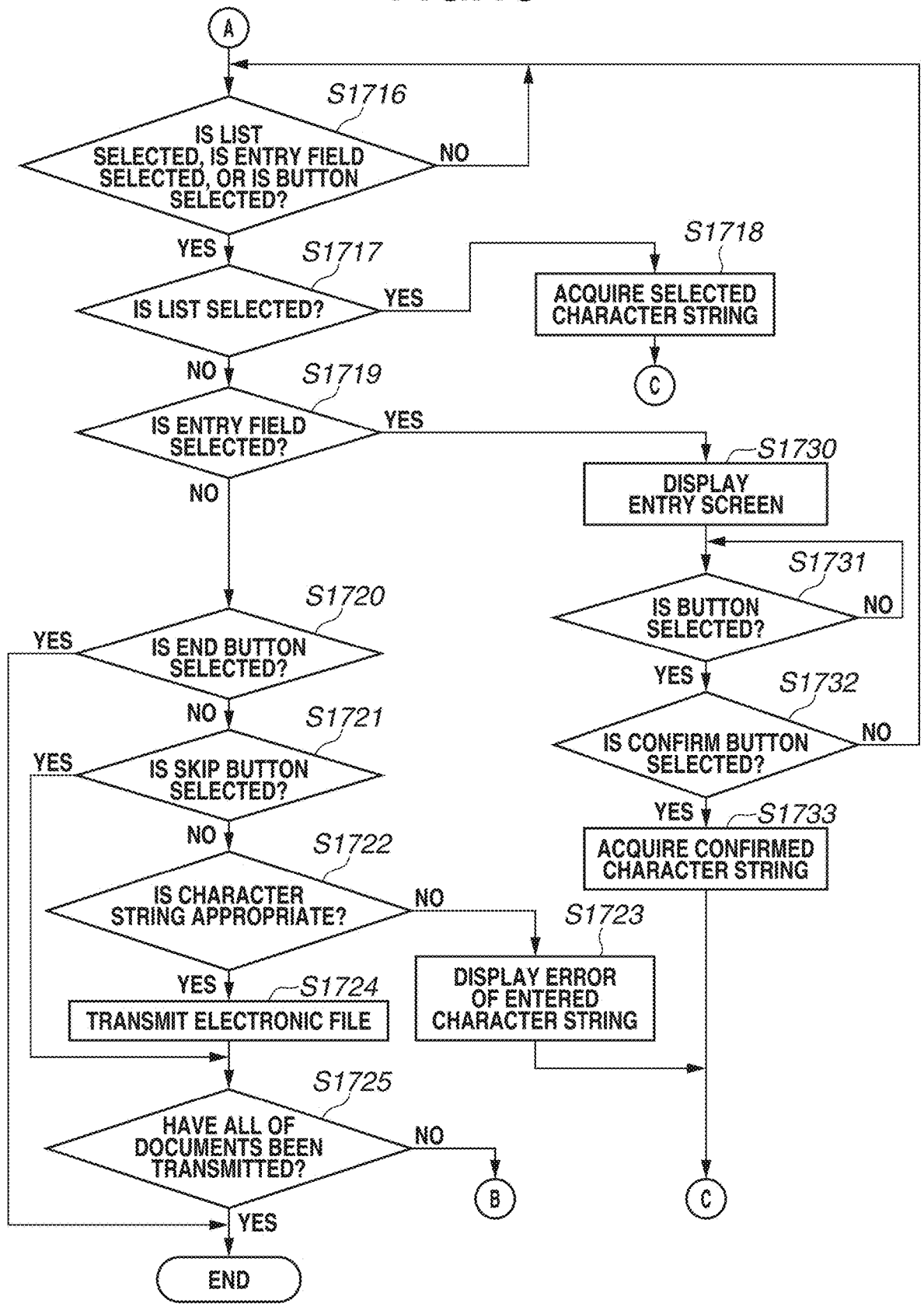
FIG. 18 is a flowchart illustrating an example of OCR transmission processing.

From here, the OCR transmission processing is described with reference to FIG. 18. In step S1716, the CPU 201 determines whether the list 1904, the entry field 1902, or one of the buttons 1907 to 1909 has been selected. If it is determined that any one of them has been selected (YES in step S1716), the processing proceeds to step S1717. If not so (NO in step S1716), the processing returns to step S1716.

In step S1717, the CPU 201 determines whether the list 1904 has been selected. If it is determined that the list 1904 has been selected (YES in step S1717), the processing proceeds to step S1718. If not so (NO in step S1717), the processing proceeds to step S1719.

In step S1718, the CPU 201 acquires a character string corresponding to the selected text object and displays the acquired character string in the entry field 1902, and, then, the processing returns to step S1708.

In step S1719, the CPU 201 determines whether the entry field 1902 has been selected. If it is determined that the entry field 1902 has been selected (YES in step S1719) the processing proceeds to step S1730. If not so (NO in step S1719), the processing proceeds to step S1720.

In step S1730, the CPU 201 controls the operation unit 205 to display the entry screen 1610.

In step S1731, the CPU 201 determines whether one of the buttons 1613 and 1614 has been selected. If it is determined that one of the buttons 1613 and 1614 has been selected (YES in step S1731), the processing proceeds to step S1732. If not so (NO in step S1731), the processing returns to step S1731.

In step S1732, the CPU 201 determines whether the confirm button 1613 has been selected. If it is determined that the confirm button 1613 has been selected (YES in step S1732), the processing proceeds to step S1733. If not so (NO in step S1732), in other words, if the cancel button 1614 has been selected, the processing returns to step S1716.

In step S1733, the CPU 201 acquires a character string entered in the entry field 1612 (stores the character string in the RAM 203) and displays the acquired character string in the entry field 1902, and, then, the processing returns to step S1708.

In step S1720, the CPU 201 determines whether the end button 1907 has been selected. If it is determined that the end button 1907 has been selected (YES in step S1720), the processing ends. If not so (NO in step S1720), the processing proceeds to step S1721.

In step S1721, the CPU 201 determines whether the skip button 1908 has been selected. If it is determined that the skip button 1908 has been selected (YES in step S1721), the processing proceeds to step S1725. If not so (NO in step S1721), the processing proceeds to step S1722.

In step S1722, the CPU 201 determines whether a character string displayed in the entry field 1902 satisfies a condition (the type of character and the number of characters) set in the pull-down menu 701 and the entry field 702, as in processing performed in step S1507. If it is determined that the character string satisfies the condition (YES in step S1722), the processing proceeds to step S1724. If not so (NO in step S1722), the processing proceeds to step S1723.

In step S1723, the CPU 201 controls the operation unit 205 to display an error notification screen indicating that the type of character entered or the number of characters entered is not appropriate. Then, the processing returns to step S1708.

In step S1724, the CPU 201 controls the network I/F 208 to transmit an electronic file to a folder indicated by a folder path obtained by adding the entered character string to a folder present at the lowermost layer of the destination set in advance.

In step S1725, the CPU 201 determines whether electronic files of all of the read documents have been transmitted. If it is determined that the electronic files of all of the read documents have been transmitted (YES in step S1725), the processing ends. If not so (NO in step S1725), the CPU 201 acquires image data corresponding to a next document and the processing returns to step S1701.

With the above-described processing performed, the trouble required for the user to determine a plurality of folders to which electronic files that are based on a plurality of documents are transmitted in a divisional manner can be reduced.

Moreover, when the MFP 101 sets a character string obtained as a result of character recognition processing as a part of a folder path to which to transmit image data, it is possible to prevent the user from designating a falsely recognized character string as a folder path.

Furthermore, in the first exemplary embodiment, when a one-touch transmission button with reading setting or transmission setting set by, for example, a remote user interface (UI) in advance is selected, each transmission processing such as OCR transmission processing is performed. However, the first exemplary embodiment is not limited to this, and a configuration in which, in a normal transmission screen, reading setting, including setting as to whether to perform character recognition processing, and transmission processing are received and the other needed settings including the number of documents for divisional transmission are received and, when a transmission start instruction is issued, processing in step S1102 and subsequent steps is performed can be employed. In that case, processing in step S1105 can be omitted.

As described above, the image processing apparatus according to the first exemplary embodiment receives selection of one of displayed character strings performed by the user a plurality of times, and determines, as storage destinations, a plurality of folders named with the respective character strings that are based on the received selection performed a plurality of times.

In the above-described first exemplary embodiment, an example in which, even when a character recognition region is previously set, a preview image and a list of text objects are displayed has been described. When a preview image and a list of text objects are displayed, a processing load imposed on the MFP 101 is increased. To solve this issue, in a second exemplary embodiment, since, in a case where a character recognition region is previously set, there is a high possibility of a character string intended by the user being extracted, an example of displaying a simplified screen without displaying a preview image and a list of text objects is described.

Figure 22:
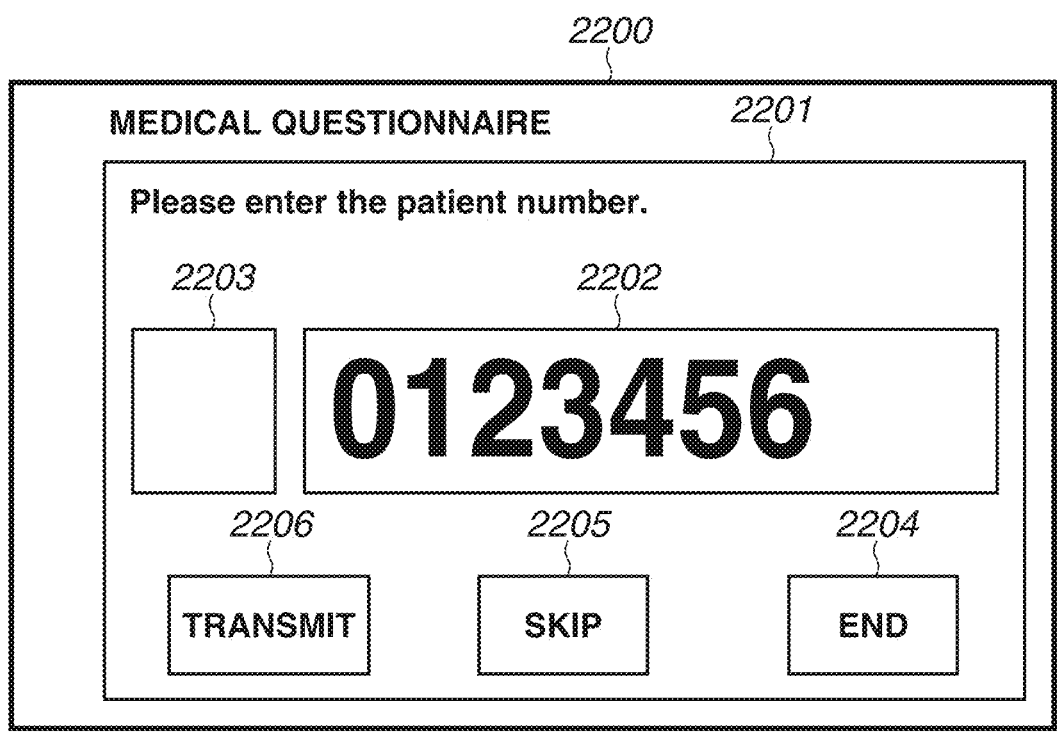
FIG. 22 is a diagram illustrating an example of an OCR transmission screen.

In the second exemplary embodiment, in a case where a character recognition region is previously set (YES in step S1705), the CPU 201 controls the operation unit 205 to display a screen such as that illustrated in FIG. 22.

FIG. 22 is a diagram illustrating an example of an OCR transmission screen. The OCR transmission screen 2200 illustrated in FIG. 22 is a screen which is displayed on the operation unit 205.

A message region 2201 is a region in which a character string entered in the entry field 703 is displayed. In the second exemplary embodiment, a character string "Please enter the patient number" is displayed.

An entry field 2202 is an entry field used to designate the name of a folder in which to store image data generated by image reading. In the second exemplary embodiment, the entered patient number serves as a folder name. In the second exemplary embodiment, since a character recognition region is previously set, a character string contained in the character recognition region is extracted and then displayed in the entry field 2202. Moreover, when the entry field 2202 is selected, the entry screen 1610 illustrated in FIG. 16B is displayed.

An icon display region 2203 is a region in which to display an icon such as "! (exclamation mark)" or "? (question mark)", as with the icon display region 1903 in the first exemplary embodiment.

An end button 2204 is a button which, when selected by the user, is used to end the transmission processing. A skip button 2205 is a button which, when selected by the user, is used not to perform transmission processing for the current document but to perform transmission processing for a next document. A transmit button 2206 is a button which, when selected by the user, is used to perform transmission processing for the current document.

With the above-described processing performed, in a case where a character recognition region is previously set, a simplified screen is displayed, so that, while reducing a processing load imposed on the MFP 101, the MFP 101 is able to determine a folder path to which to transmit image data with use of an extracted character string.

In the above-described first exemplary embodiment, an example in which, in a case where an instruction for transmission has been issued via the OCR transmission screen 1900, if a character string displayed in the entry field 1902 does not satisfy a condition set in advance, the MFP 101 displays an error screen and then re-displays the OCR transmission screen 1900 to receive entry of a character string has been described.

When the MFP 101 in the first exemplary embodiment transmits image data, in a case where a character string obtained by character recognition processing or entry contains false recognition or incorrect entry, the MFP 101 cannot transmit image data to a folder until an error is eliminated by an operation performed by the user.

In a third exemplary embodiment, an example in which, after the user issues an instruction to read a document, the MFP 101 transmits image data to a folder without receiving an instruction from the user is described. Moreover, an example in which, even in a case where the recognized character string does not satisfy a condition, the MFP 101 transmits image data to a folder without receiving an instruction from the user is described. Furthermore, in the third exemplary embodiment, an example of the case where a character recognition region is previously set is described.

Figure 23:
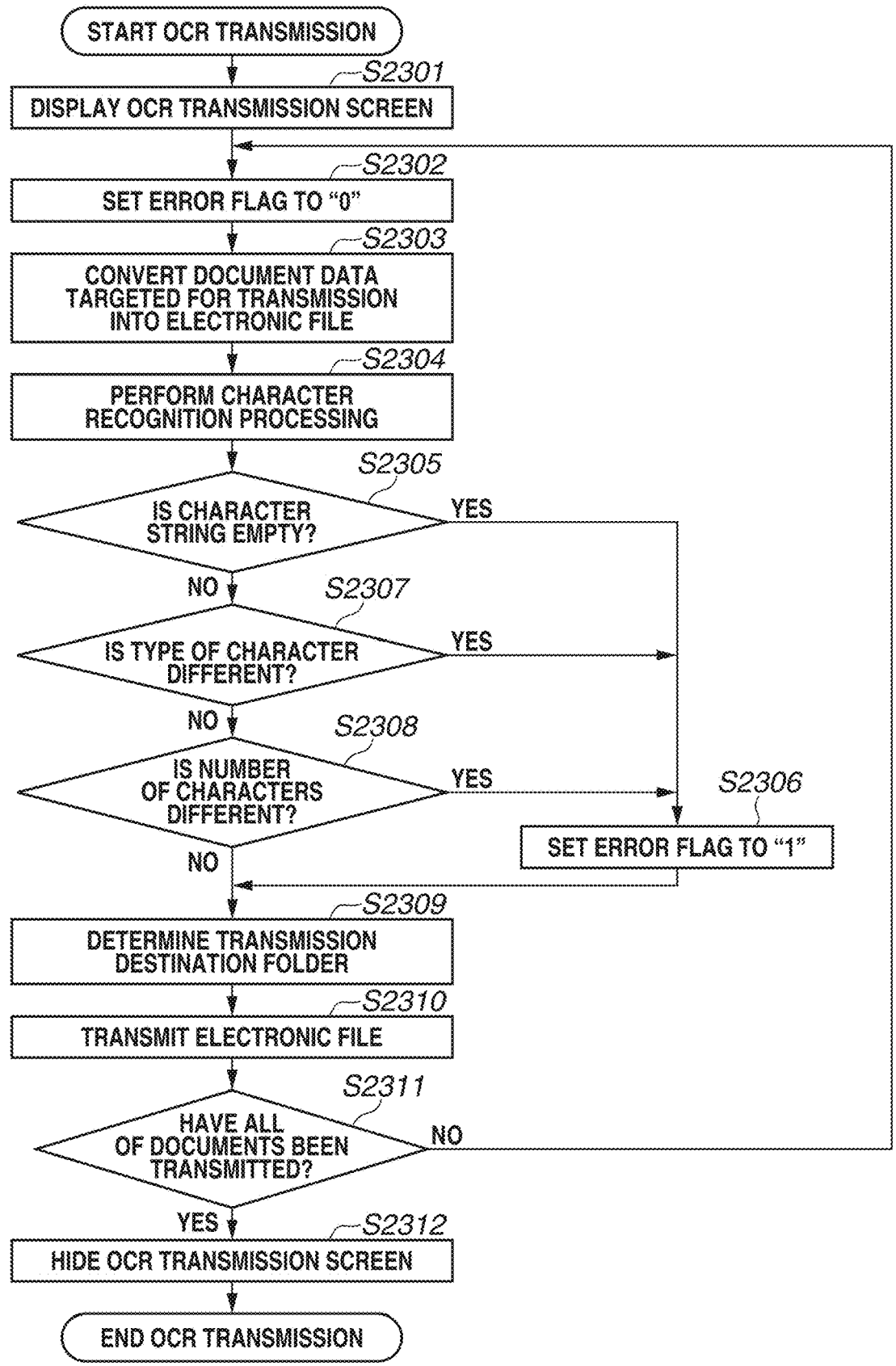
FIG. 23 is a flowchart illustrating an example of OCR transmission processing.

FIG. 23 is a flowchart illustrating an example of OCR transmission processing. The processing illustrated in the flowchart of FIG. 23 is implemented by the CPU 201 reading out a program stored in the ROM 202 onto the RAM 203 and executing the read-out program. The flow illustrated in FIG. 23 is started in response to it being determined, in processing in step S1408 illustrated in FIG. 14, that "do" is set in the pull-down menu 704 illustrated in FIG. 7A. In the third exemplary embodiment, processing performed in a case where a character recognition region is still not set is omitted from description here.

Figure 24:
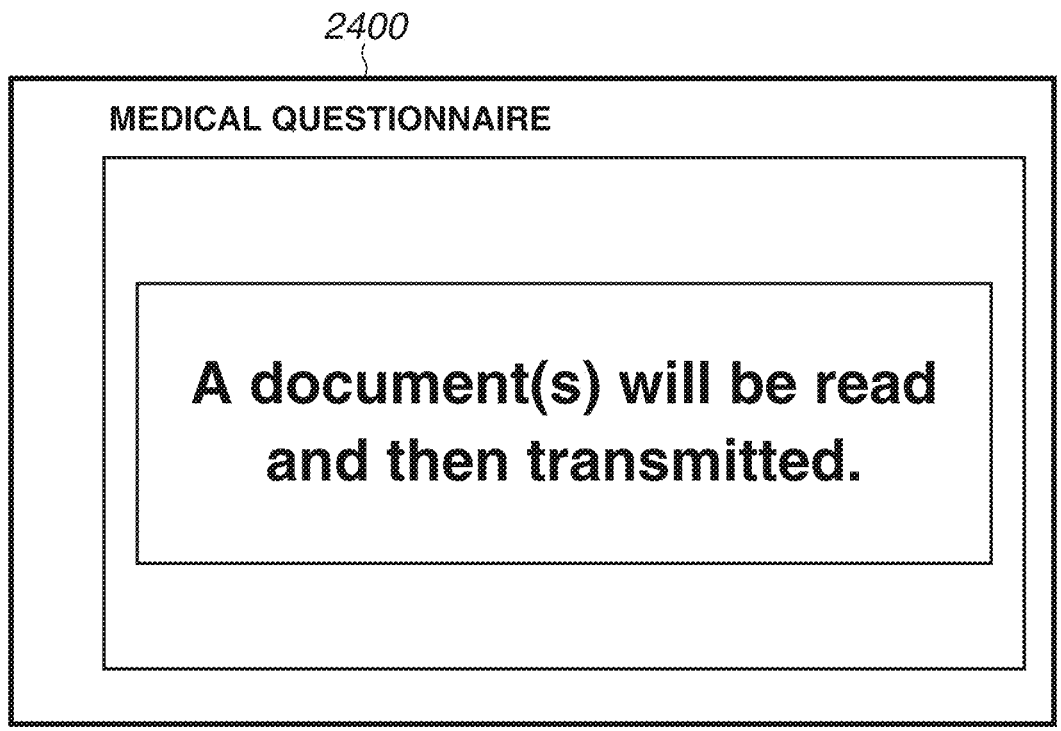
FIG. 24 is a diagram illustrating an example of an OCR transmission screen.

In step S2301, the CPU 201 controls the operation unit 205 to display an OCR transmission screen. The OCR transmission screen displayed here is an OCR transmission screen 2400 illustrated in FIG. 24. In the OCR transmission screen 2400 illustrated in FIG. 24, a message "A document(s) will be read and then transmitted." is displayed.

In step S2302, the CPU 201 sets an error flag to "0" and stores the set error flag in the RAM 203.

In step S2303, the CPU 201 generates an electronic file (including image data) in a similar way to that in processing in step S1501.

In step S2304, the CPU 201 performs character recognition processing in a previously-set character recognition region to acquire a character string. In step S2305, the CPU 201 determines whether the character string acquired in step S2304 is empty. If it is determined that the character string is empty (YES in step S2305), the processing proceeds to step S2306. If not so (NO in step S2305), the processing proceeds to step S2307.

In step S2306, the CPU 201 sets the error flag to "1" and stores the set error flag in the RAM 203.

In step S2307, the CPU 201 determines whether the character string acquired in step S2304 is a character string the type of character of which is different from the type of character set in advance. If it is determined that the type of character of the acquired character string is different from the type of character set in advance (YES in step S2307), the processing proceeds to step S2306. If not so (NO in step S2307), the processing proceeds to step S2308.

In step S2308, the CPU 201 determines whether the character string acquired in step S2304 is a character string the number of characters of which is different from the number of characters set in advance. If it is determined that the number of characters of the acquired character string is different from the number of characters set in advance (YES in step S2308), the processing proceeds to step S2306. If not so (NO in step S2308), the processing proceeds to step S2309.

In step S2309, the CPU 201 determines a transmission destination folder based on the error flag stored in the RAM 203. Specifically, in a case where the error flag set to "0" is stored, the CPU 201 sets a character string acquired by character recognition processing as a part of a folder path, and determines a folder indicated by the folder path as a transmission destination folder. For example, the CPU 201 adds a character string "123456" obtained by character recognition processing to a destination "\\file_server\medical_questionnaire" set in advance, and determines a folder indicated by a folder path "\\file_server\medical_questionnaire\123456" as a transmission destination. In a case where the error flag set to "1" is stored, the CPU 201 determines, as a transmission destination, a folder "\\file_server\medical_questionnaire\ERROR" obtained by adding a folder "ERROR" to below a folder "\\file_server\medical_questionnaire" set in advance. A folder to be added to a hierarchical layer just below the folder "\\file_server\medical_questionnaire" can be optionally determined by the user.

In step S2310, the CPU 201 transmits an electronic file to the transmission destination determined in step S2309.

In step S2311, the CPU 201 determines whether electronic files corresponding to all of the read documents have been transmitted. If it is determined that the electronic files corresponding to all of the read documents have been transmitted (YES in step S2311), the processing proceeds to step S2312. If not so (NO in step S2311), the processing returns to step S2302.

In step S2312, the CPU 201 controls the operation unit 205 to hide the OCR transmission screen 2400, and, then, the processing ends.

With the above-described processing performed, after the user issues an instruction to read a document, the MFP 101 is able to transmit image data to a folder without receiving an instruction from the user, thus saving the user's trouble. Moreover, since the MFP 101 is able to transmit, to an error folder, an electronic file corresponding to a document in which a character string obtained by character recognition processing does not satisfy a condition, after transmission processing is completed, the user is allowed to collectively confirm electronic files which have not been transmitted to intended folders due to errors.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-036851 filed Feb. 28, 2019, which is hereby incorporated by reference herein in its entirety.

What is claimed is:

1. An image processing apparatus comprising:
   a scanning unit configured to scan a document to generate image data;
   a character recognition unit configured to recognize at least one character included in the image data generated by the scanning unit;
   a display unit configured to display the at least one character recognized by the character recognition unit;
   a reception unit configured to receive selection, by a user, of a character or characters from among the at least one character displayed by the display unit and a transmission instruction; and
   a transmitting unit configured to transmit, based on the received transmission instruction, the image data for storing the image data in a folder having the folder name determined using the character or characters selected from among the displayed at least one character,
   wherein the scanning unit scans, based on a single execution instruction, a plurality of documents to generate image data, and then the reception unit receives selection of the character or characters by the user and the transmission instruction individually for each of the plurality of documents of which the images are scanned, and
   wherein the display unit displays, after the reception unit receives the transmission instruction for transmitting first image data generated by scanning a first document of the plurality of documents, at least one character included in second image data generated by scanning a second document next to the first document.

2. The image processing apparatus according to claim 1, further comprising a second reception unit configured to receive a path,
   wherein the transmitting unit transmits the image data for storing the image data in the folder indicated by a path including the determined folder name and the received path.

3. The image processing apparatus according to claim 2, wherein the received path includes a host name.

4. The image processing apparatus according to claim 1, wherein the display unit displays a list of the at least one character recognized by the character recognition unit.

5. The image processing apparatus according to claim 1, further comprising an operation unit,
wherein the transmitting unit transmits the image data for storing the image data in the folder having the folder name determined using the character or characters selected by the user via the operation unit from among the at least one character displayed by the display unit.

6. The image processing apparatus according to claim 1, wherein the character recognition unit recognizes, as the at least one character, a plurality of characters included in the image data, and the display unit displays the plurality of characters.

7. The image processing apparatus according to claim 1,
wherein, based on completing recognition of the at least one character, the display unit displays the at least one character and an image of the document, and
wherein, based on the selection of the character or characters from among the at least one character displayed on the display unit, the display unit highlights an area in which the selected character is, or the selected characters are, displayed on the image.

8. The image processing apparatus according to claim 1, further comprising a third reception unit configured to receive an instruction for switching an image of the document currently displayed by the display unit to an image of a document scanned next to the currently displayed document,
wherein, in response to the third reception unit receiving the instruction for switching the image, the display unit displays, instead of an image of the currently displayed document, an image of a document read next to the currently displayed document.

9. The image processing apparatus according to claim 1, wherein, based on the selected character or characters not satisfying a predetermined condition, the display unit displays information indicating a warning.

10. The image processing apparatus according to claim 9, wherein the predetermined condition is a condition relating to a number of characters of the selected character or characters and a type of the selected character or characters.

11. The image processing apparatus according to claim 1, wherein the character includes a numeral.

12. The image processing apparatus according to claim 1, wherein the transmitting unit transmits the image data for storing the image data to the folder having the determined folder name using at least one of File Transfer Protocol (FTP), Server Message Block (SMB), and Web Distributed Authoring and Versioning (WebDAV).

13. An image processing method comprising:
scanning a document to generate image data;
recognizing at least one character included in the generated image data;
displaying the at least one recognized character;
receiving selection, by a user, of a character or characters from among the at least one displayed character and a transmission instruction; and
transmitting, based on the received transmission instruction, the image data for storing the image data in a folder having the folder name determined using the character or characters selected from among the displayed at least one character,
wherein, based on a single execution instruction, a plurality of documents are scanned to generate image data, and then selection of the character or characters by the user and the transmission instruction individually for each of the plurality of documents of which the images are scanned is received, and
wherein, after the transmission instruction for transmitting first image data generated by scanning a first document of the plurality of documents is received, at least one character included in second image data generated by scanning a second document next to the first document is displayed.

14. A non-transitory computer-readable storage medium storing computer-executable instructions that, when executed by a computer, cause the computer to perform an image processing method, the image processing method comprising:
scanning a document to generate image data;
recognizing at least one character included in the generated image data;
displaying the at least one recognized character;
receiving selection, by a user, of a character or characters from among the at least one displayed character and a transmission instruction; and
transmitting, based on the received transmission instruction, the image data for storing the image data in a folder having the folder name determined using the character or characters selected from among the displayed at least one character,
wherein, based on a single execution instruction, a plurality of documents are scanned to generate image data, and then selection of the character or characters by the user and the transmission instruction individually for each of the plurality of documents of which the images are scanned is received, and
wherein, after the transmission instruction for transmitting first image data generated by scanning a first document of the plurality of documents is received, at least one character included in second image data generated by scanning a second document next to the first document is displayed.

* * * * *